US012132256B2

(12) United States Patent
Hikido et al.

(10) Patent No.: US 12,132,256 B2
(45) Date of Patent: Oct. 29, 2024

(54) RECONFIGURABLE FEED ARRAY FED CONFOCAL ANTENNA SYSTEM THAT CAN ADJUST THE RADIATION PATTERN BEAM SIZE AND THE GAIN PERFORMANCE ON-ORBIT

(71) Applicant: The Boeing Company, Chicago, IL (US)

(72) Inventors: Thomas Makoto Hikido, Torrance, CA (US); William Joseph Ceely, Fontana, CA (US); Paul Christian Werntz, Long Beach, CA (US); Raenaurd D. Turpin, La Mirada, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/714,728

(22) Filed: Apr. 6, 2022

(65) Prior Publication Data

US 2022/0328977 A1 Oct. 13, 2022

Related U.S. Application Data

(60) Provisional application No. 63/171,906, filed on Apr. 7, 2021.

(51) Int. Cl.
*H01Q 19/19* (2006.01)
*H01Q 3/20* (2006.01)
(52) U.S. Cl.
CPC ............ *H01Q 19/193* (2013.01); *H01Q 3/20* (2013.01)

(58) Field of Classification Search
CPC ........................................ H01Q 3/20
USPC ........................................... 343/781
See application file for complete search history.

(56) References Cited

U.S. PATENT DOCUMENTS

| | | | | |
|---|---|---|---|---|
| 3,938,162 | A * | 2/1976 | Schmidt | H01Q 19/20 343/837 |
| 6,031,502 | A * | 2/2000 | Ramanujam | H01Q 3/16 343/781 P |
| 6,611,226 | B1 * | 8/2003 | Jones | G01S 13/68 342/160 |
| 8,009,116 | B2 * | 8/2011 | Peichl | G01S 13/89 343/781 CA |

(Continued)

FOREIGN PATENT DOCUMENTS

EP 2779306 A1 * 9/2014 ............. H01Q 1/288

*Primary Examiner* — Hoang V Nguyen
*Assistant Examiner* — Brandon Sean Woods
(74) *Attorney, Agent, or Firm* — Jordan IP Law, LLC

(57) ABSTRACT

Systems, apparatuses, and methods provides for technology that controls a confocal antenna system. The technology controls an Integrated Phased Array (IPA) feed system to emit electromagnetic energy towards a sub-reflector, where the sub-reflector reflects the electromagnetic energy to a main reflector, and further where the main reflector receives and reflects the electromagnetic energy to form a radiation pattern on an area. The radiation pattern has a first size and a first gain. The technology conducts an identification that the radiation pattern is to be adjusted so as to adjust the first size to a second size and adjust the first gain to a second gain. In response to the identification, the technology moves the main reflector linearly along a first axis, and electronically steers a beam of the electromagnetic energy emitted from the IPA feed system towards the sub-reflector.

20 Claims, 18 Drawing Sheets

(56) References Cited

U.S. PATENT DOCUMENTS

| | | | | |
|---|---|---|---|---|
| 9,478,861 | B2* | 10/2016 | Fonseca | ............... H01Q 5/45 |
| 10,897,075 | B2* | 1/2021 | Cooley | ............. H01Q 19/18 |
| 2016/0372835 | A1* | 12/2016 | Toso | ............... H01Q 19/192 |
| 2020/0052411 | A1* | 2/2020 | Noh | ................ H01Q 3/20 |
| 2022/0181789 | A1* | 6/2022 | Onishi | ............... B64G 1/222 |

* cited by examiner

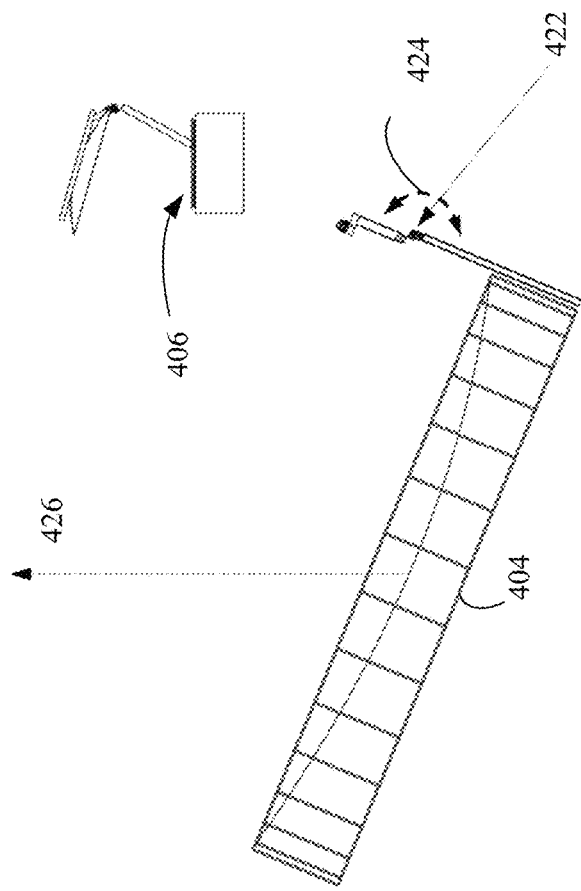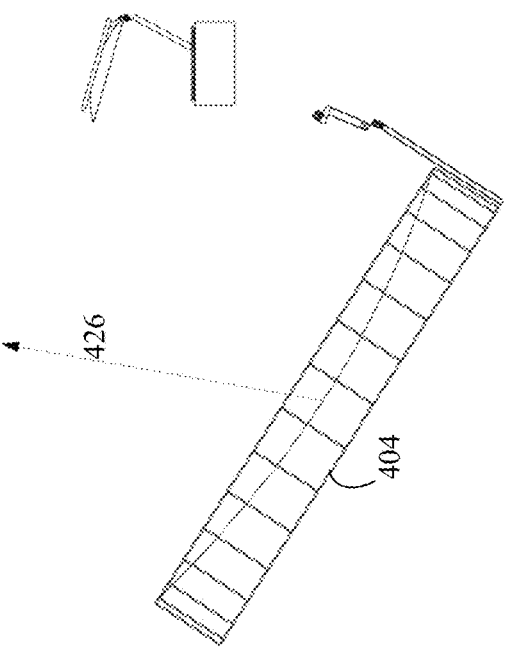
FIG. 4C
FIG. 4D

Sample Element Pattern
(through Confocal System)
Peak Dir = 25.25dBi

Scanned Beam: az: 0, el: 0
Peak Dir = 51.28dBi

Scanned Beam: az: -5, el: 0
Peak Dir = 48.73dBi

Sample Element Pattern
(through Confocal System)
Peak Dir = 23.29dBi

Scanned Beam: az: 0, el: 0
Peak Dir = 48.01dBi

Scanned Beam: az: -6, el: 0
Peak Dir = 43.65dBi

Sample Element Pattern
(through Confocal System)
Peak Dir = 22.62dBi

Scanned Beam: az: 0, el: 0
Peak Dir = 45.90dBi

Scanned Beam: az: -7, el: 0
Peak Dir = 41.69dBi

RECONFIGURABLE FEED ARRAY FED CONFOCAL ANTENNA SYSTEM THAT CAN ADJUST THE RADIATION PATTERN BEAM SIZE AND THE GAIN PERFORMANCE ON-ORBIT

CROSS REFERENCE TO RELATED APPLICATIONS

This application claims benefit of and priority to U.S. Provisional Patent Application No. 63/171,906, filed Apr. 7, 2021, the contents of which are incorporated herein by reference in its entirety.

TECHNICAL FIELD

Examples generally relate to focusing and defocusing satellite based confocal antenna. More particularly, examples relate to adjusting a field-of-view (FOV) of the antenna to thereby adjust a radiation pattern for the satellite.

BACKGROUND

Confocal communication satellites are employed to receive electromagnetic signals from ground components, process the signals and/or retransmit the signals to other ground components. The signals contain various types of information ranging from voice, video, data, images, etc. for communication between various ground components through the satellite. The satellite can thus both receive information and transmit information.

Satellites employ antennas to transmit and receive signals, and can be fixed optical systems that do not permit modification of positions of components relative to each other once live. Antennas have the ability to direct the signals to a specific location and the ability to tune to signals emanating from a specific location. Antennas can transmit signals having given frequencies to a specific location by focusing the signals into a radiation pattern. Similarly, antennas tune to the same radiation pattern to receive signals with the given frequencies emanating from the specific location. The gain of an antenna is the measure of the ability of an antenna to increase the power to a given area by reducing the power to other areas (e.g., a sensitivity of the antenna). The gain can be related to the size of the radiation pattern and is related to a data rate that the antenna can support (e.g., the higher the gain the higher the data rate).

SUMMARY OF THE INVENTION

In accordance with one or more examples, provided is a confocal antenna system comprising an Integrated Phased Array (IPA) feed system to emit electromagnetic energy, a sub-reflector to reflect the electromagnetic energy, a main reflector to receive and reflect the electromagnetic energy to form a radiation pattern on an area, wherein the radiation pattern has a first size and a first gain, at least one processor, and at least one memory coupled to the at least one processor. The at least one memory includes a set of instructions, which when executed by the at least one processor, causes the confocal antenna system to conduct an identification that the radiation pattern is to be adjusted so as to adjust the first size to a second size and adjust the first gain to a second gain; and in response to the identification, move the main reflector linearly along a first axis, and electronically steer a beam of the electromagnetic energy emitted from the IPA feed system towards the sub-reflector.

In accordance with one or more examples, provided is at least one non-transitory computer readable storage medium comprising a set of instructions, which when executed by a computing device associated with a confocal antenna system, causes the computing device to control an Integrated Phased Array (IPA) feed system to emit electromagnetic energy towards a sub-reflector, wherein the sub-reflector reflects the electromagnetic energy to a main reflector, wherein the main reflector receives and reflects the electromagnetic energy to form a radiation pattern on an area, wherein the radiation pattern has a first size and a first gain; and to conduct an identification that the radiation pattern is to be adjusted so as to adjust the first size to a second size and adjust the first gain to a second gain. In response to the identification, the system moves the main reflector linearly along a first axis, and electronically steers a beam of the electromagnetic energy emitted from the IPA feed system towards the sub-reflector.

In accordance with one or more examples, provided is a method of controlling a confocal antenna system. The method comprises controlling an Integrated Phased Array (IPA) feed system to emit electromagnetic energy towards a sub-reflector, wherein the sub-reflector reflects the electromagnetic energy to a main reflector, wherein the main reflector receives and reflects the electromagnetic energy to form a radiation pattern on an area, wherein the radiation pattern has a first size and a first gain; and conducting an identification that the radiation pattern is to be adjusted so as to adjust the first size to a second size and adjust the first gain to a second gain. In response to the identification, moving the main reflector linearly along a first axis, and electronically steering a beam of the electromagnetic energy emitted from the IPA feed system towards the sub-reflector.

BRIEF DESCRIPTION OF THE DRAWINGS

The various advantages of the examples will become apparent to one skilled in the art by reading the following specification and appended claims, and by referencing the following drawings, in which:

FIG. 4C is an example of rotation process of rotating a main reflector;

FIG. 4D is an example of a rotated main reflector;

DETAILED DESCRIPTION

Figure 1:
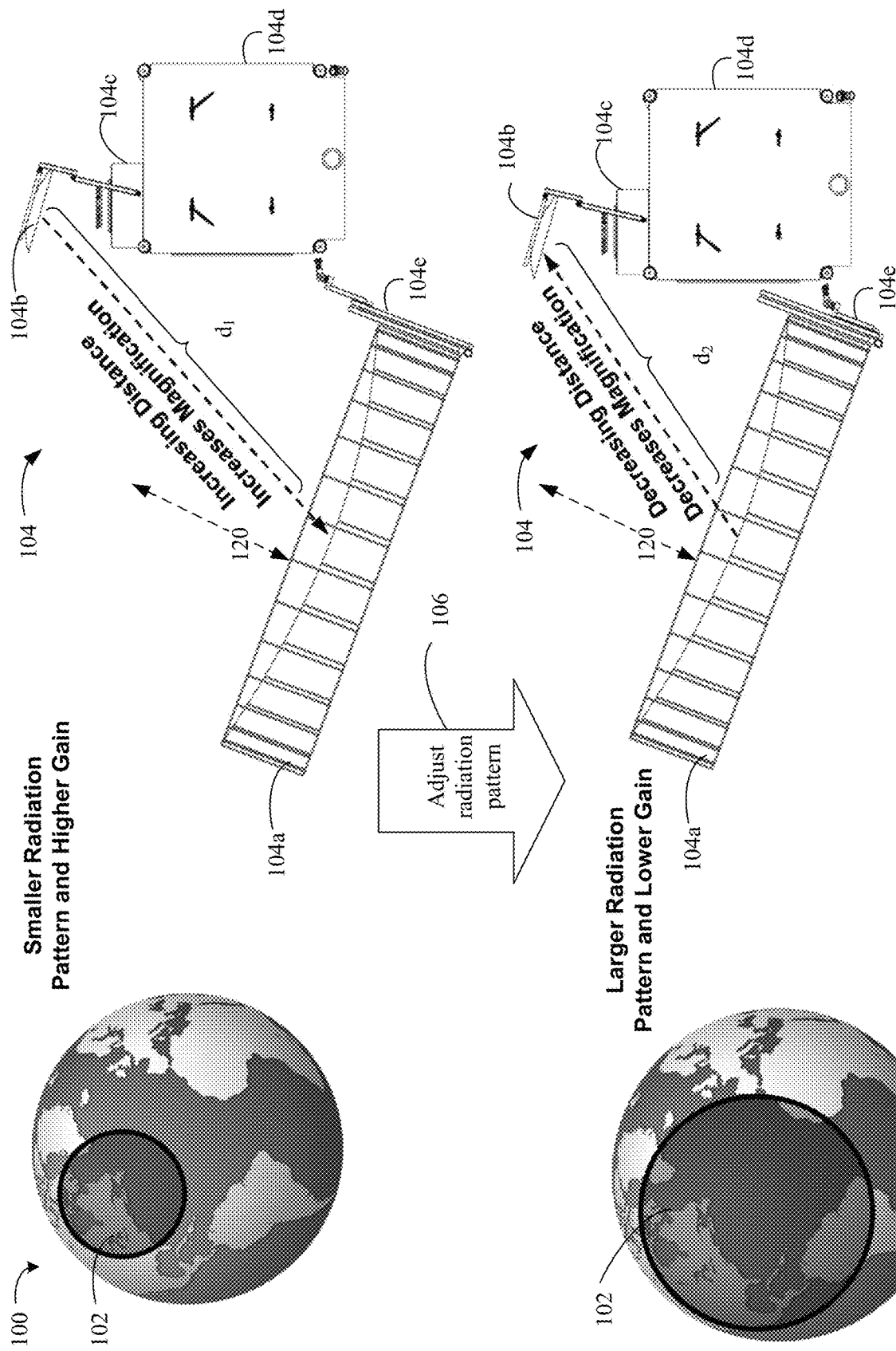
FIG. 1 is a process of an example of adjusting a radiation pattern.

Turning now to FIG. 1, process 100 of adjusting a radiation pattern 102 of a satellite 104 is illustrated. The radiation pattern 102 corresponds to a "FOV" of the satellite 104. The satellite 104 can target a spot beam (e.g., a focused beam that is increased and concentrated in power to increase gain) within the radiation pattern 102 so that the spot beam covers only a fraction of the radiation pattern 102 (increases gain in the fraction) and is able to be moved within the radiation pattern 102. Conversely the satellite 104 can transmit a wide beam (e.g., a less focused beam that is decreased in power) to cover the entire radiation pattern 102 while reducing the gain. Thus, the radiation pattern 102 is a maximum coverage area of the satellite 104.

The satellite 104 includes an antenna assembly that includes a main reflector 104a (e.g., a parabolic reflector, a semi-parabolic reflector or a shaped reflector), a sub-reflector 104b, an Integrated Phased Array (IPA) feed system 104c and a supporting body 104d. The satellite 104 further includes an adjustment mechanism 104e that can adjust a position of the main reflector 104a relative to both the sub-reflector 104b and IPA feed system 104c to adjust optics of the satellite 104 (e.g., zoom in on an area of the Earth, zoom out from the area, increase gain, decrease gain, change area of focus, adjust size, shape and/or position FOV, etc.). The adjustment mechanism 104e is attached to the supporting body 104d.

The IPA feed system 104c is directed at the sub-reflector 104b. The satellite 104 can operate in a transmission and reception mode. In a transmission mode, the IPA feed system 104c illuminates the sub-reflector 104b with electromagnetic energy. The electromagnetic energy can be radio-frequency (RF) signals. The sub-reflector 104b then reflects this energy to illuminate the main reflector 104a. The main reflector 104a reflects and focuses the electromagnetic energy to generate radiation pattern 102 on the Earth. The IPA feed system 104c can be located at a common focal point of the main reflector 104a and the sub-reflector 104b. For example, the IPA feed system 104c can be located in a collimated beam produced by the main reflector 104a and the sub-reflector 104b. Thus, the IPA feed system 104c can intercept reflected electromagnetic energy (e.g., a beam) from the main reflector 104a via the sub-reflector 104b to receive transmissions.

The satellite 104 includes a confocal antenna that provides magnification of the radiation pattern 102. The satellite 104 includes the confocal antenna that provides magnification of the radiation pattern 102. In the baseline configuration, the satellite 104 determines a relation between the main reflector 104a optics and the sub-reflector 104b optics based on the main reflector 104a baseline focal length which maintains common main reflector 104a and sub-reflector 104b focal points to set the radiation pattern 102. For example, in a baseline configuration, the satellite 104 sets a ratio between focal lengths of the main reflector 104a and sub-reflector 104b, while maintaining a common focal point to set the radiation pattern 102. Once the main reflector 104a is moved from a baseline location of the baseline configuration, the focal points of the main reflector 104a and the sub-reflector 104b are no longer common. Embodiments can adjust an "effective" focal length for the main reflector 104a to change the magnification as the main reflector 104a is moved and adjust the IPA feed system 104c to compensate for aberrations.

The radiation pattern 102 includes attributes such as size and gain (e.g., maximum gain) which can be adjustable by changing a distance between the main reflector 104a and the sub-reflector 104b, and adjusting operating parameters of the IPA feed system 104c. For example, in this example the distance is increased to be set to a length $d_1$ to increase the magnification. Thus, by increasing the distance, the radiation pattern 102 can correspondingly be reduced in size but have an increased gain. The increased gain can facilitate higher fidelity communications at a cost to a size of the radiation pattern 102. For example, the increased gain can increase a throughput (e.g., increase a rate of message reception and delivery) and/or bandwidth to a covered area. For example, the increased gain can enable higher throughput or data bandwidth for an exchange of a reduced size of the radiation pattern 102 (e.g., a coverage area). Conversely, decreasing the distance will result in a decrease in throughput and/or data bandwidth with an increase in size of the radiation pattern 102 or coverage size is obtained.

Adjusting the distance to $D_1$ can result in undesirable aberrations to the shape of the radiation pattern 102 (e.g., beam main lobe and sidelobe integrity can be reduced). To mitigate, reduce or eliminate the aberrations, examples include controlling the IPA feed system 104c. Other confocal antennas provide magnification of the antenna radiation pattern by setting the ratio between focal lengths of a main reflector and sub-reflector, while maintaining a common focal point. Changing the focal point of each reflector requires modification of the reflector shape, while maintaining a common focal point requires repositioning of the reflectors about multiple axes. In contrast, some examples simplify the readjustment process by altering performance parameters of the IPA feed system 104c to reduce and/or eliminate aberrations and maintain beam main lobe and sidelobe integrity.

That is, examples described herein allow the confocal antenna system to provide magnification with translation being limited to a single axis and without changing the shape of the main reflector 104a. Complexity of the overall process is dramatically reduced using the IPA feed system 104c (e.g., an electronically-reconfigurable phased array feed that is capable of digital signal processing) that compensates for non-idealities introduced by fixed focal lengths, single axis translation and different focal points. Thus, the IPA feed system 104c assures beam main lobe and sidelobe integrity of the radiation pattern 102 at any main reflector 104a position and magnification.

For example, the IPA feed system 104c emits electromagnetic energy towards the sub-reflector 104b where the sub-reflector 104b reflects the electromagnetic energy to the main reflector 104a. The IPA feed system 104c is an electronically-reconfigurable phased array feed that adjusts the electromagnetic energy emitted from the IPA feed system 104c to reduce or eliminate one or more aberrations caused by moving the main reflector 104a. For example, a direction of the electromagnetic energy emitted from the IPA feed system 104c can be electronically adjusted for example by adjusting emitter phases, and/or amplitude and phase of the electromagnetic energy emitted from the IPA feed system 104c to steer a beam of the electromagnetic energy emitted from the IPA feed system 104c. For example, the IPA feed system 104c suppresses an amount of the electromagnetic energy emitted in a first direction from the IPA feed system 104c towards the sub-reflector 104b, and increases an amount of the electromagnetic energy emitted in a second direction from the IPA feed system 104c towards the sub-reflector 104b. Doing so can adjust where the electromagnetic energy impinges on the sub-reflector 104b. Thus, some examples can include the IPA feed system 104c electronically beam steering electromagnetic energy to the sub-reflector 104b to control where the beam strikes the sub-reflector 104b.

In addition to steering phase correction, the IPA feed system 104c can correct for higher order phase distortions caused by a reflector system including main reflector 104a and sub-reflector 104b. Such phase distortions include spherical phase errors, parabolic phase errors, and comma phase errors up to any polynomial. These corrections can be combined with the correction to steering using the process of superposition of waves of electromagnetic energy emitted from the IPA feed system 104c. In some examples, the superposition of waves means the phase of individual emitters of the array required to steer the beam in the desired direction can be linearly added to the complex excitation (e.g., amplitude and phase) of individual emitters of the array required to correct for higher order phase distortions to obtain an excitation that both steers the beam and corrects for higher order phase distortions of the array.

In this example, the radiation pattern 102 is at a first size and has a first gain. The process 100 conducts an identification that the radiation pattern 102 is to be adjusted so as to adjust the first size to a second size and adjust the first gain to a second gain. For example, the satellite 104 can receive an instruction from a ground component to adjust the radiation pattern 102 from a first size and a first gain to a second size and a second gain. In response to the identification, the process 100 adjusts the radiation pattern 102, 106. For example, main reflector 104a can be moved linearly along an axis 120 by the adjustment mechanism 104e. The axis 120 can be perpendicular to a reflective surface of the main reflector 104a that reflects the electromagnetic energy from the sub-reflector 104b.

Concurrently, the IPA feed system 104c electronically steers a beam of the electromagnetic energy emitted from the IPA feed system 104c towards the sub-reflector 104b. For example, main reflector 104a is moved relative to the sub-reflector 104b and the IPA feed system 104c along the axis 120. The sub-reflector 104b and the IPA feed system 104c can remain stationary on the satellite 104. The IPA feed system 104c can adjust for aberrations caused by moving the main reflector 104a through beam steering. Doing so can enhance a shape of the radiation pattern 102 by forming the radiation pattern 102 into a desired shape (e.g., circular) while bypassing other corrective measures, such as rotating the main reflector 104a, to enhance the shape. Thus, it can be sufficient to linearly move the main reflector 104a along axis 120 while adjusting the beam of the IPA feed system 104c to adjust the radiation pattern 102, without rotating the main reflector 104a. In some examples, the adjustment mechanism 104e can also rotate the main reflector 104a along, or about, a second axis perpendicular to the first axis if desired, but doing so is unnecessary in some examples. Such adjustments can be pre-programmed in an a-priori situation.

In this example, the distance is decreased from length $d_1$ to length $d_2$ while the IPA feed system 104c adjusts the emission of electromagnetic energy described above. Doing so increases the size of the radiation pattern 102 (zooms out to increase the FOV) as illustrated in the bottom portion of FIG. 1, and further lowers the gain. In some examples, the sub-reflector 104b is also moveable. For example, the sub-reflector 104b can be moved relative to the main reflector 104a and the IPA feed system 104c. For example, the sub-reflector 104b can be moved in any direction, and can be rotatable, moved linearly along an axis, etc.

Figure 2:
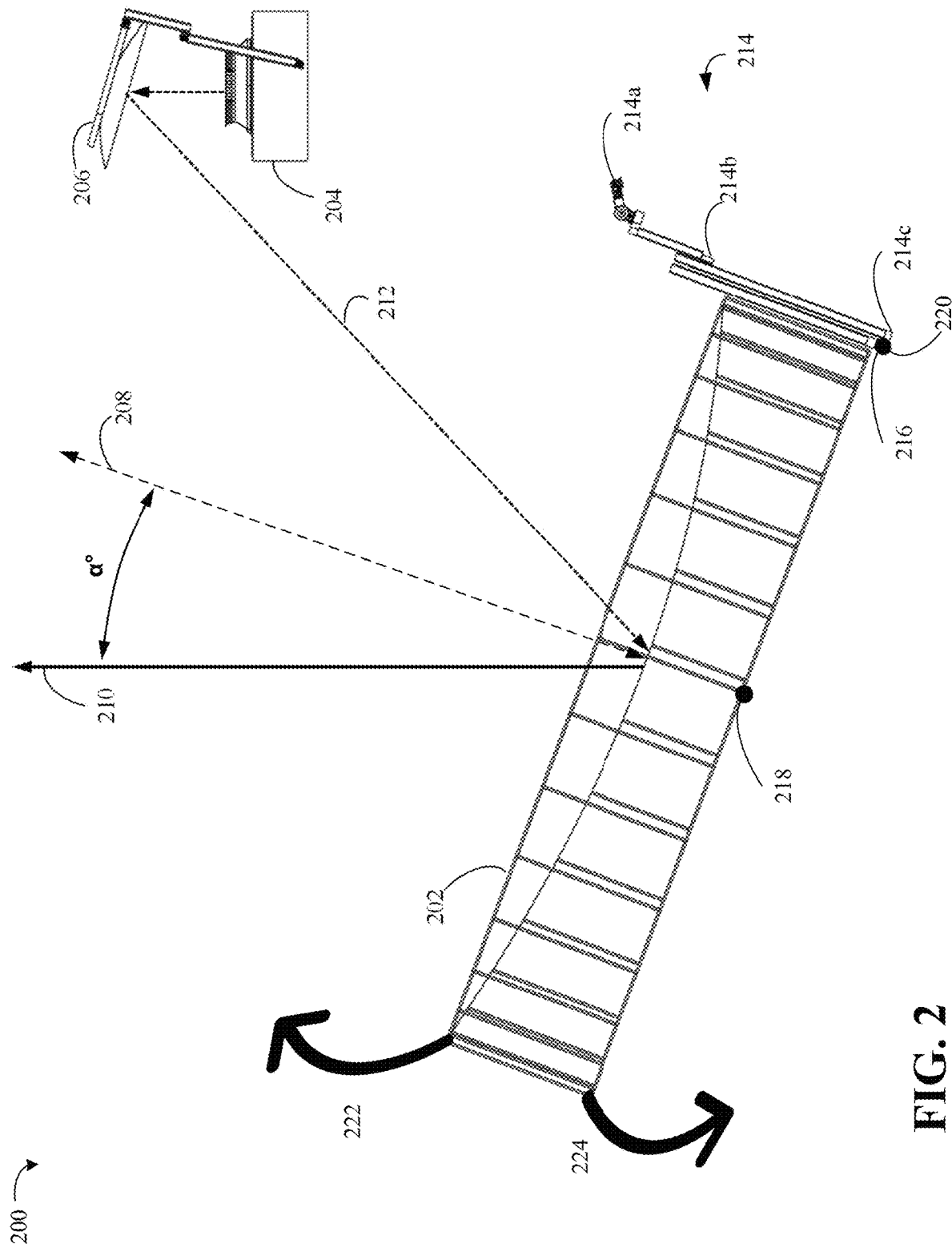
FIG. 2 is an example of a defocused confocal antenna.

FIG. 2 illustrates a defocused confocal antenna 200. Some elements are omitted for clarity. Examples of FIG. 2 can be used in conjunction with any of the examples described herein, such as process 100 (FIG. 1). In this example, a reflector bore sight 210 of the main reflector 202 extends upwardly. The bore sight 210 is the axis of maximum gain and/or peak gain. A defocusing vector 208 is approximately perpendicular to a major surface of the main reflector 202. The defocusing vector 208 is separate from the reflector bore sight 210 by $\alpha°$. IPA feed system 204 transmits electromagnetic energy to main reflector 202 via sub-reflector 206 along path 212. Thus, the defocused confocal antenna 200 reflects the electromagnetic energy from the main reflector 202 to generate a radiation pattern on a body, such as planet Earth.

In order to adjust the radiation pattern, the main reflector 202 is adjusted. A movement mechanism 214 transitions the main reflector 202 linearly along the defocusing vector 208 (e.g., a first axis). For example, a telescoping boom 214b can linearly move the main reflector 202. In some examples, the main reflector 202 need only be linearly adjusted without rotating the main reflector 202.

A rotational "nodding" mechanism 216 can additionally rotate the main reflector 202 about a second axis 220 that extends into the page to execute a rotational motion. Thus, in some examples, the main reflector 202 can be moved linearly and rotated. For example, the main reflector 202 can be rotated about axis 220 which is positioned at a right side of the main reflector 202. The main reflector 202 can thus be rotated in a clockwise direction 222 and a counter-clockwise direction 224. The main reflector 202 can therefore be rotated relative to the sub-reflector 206 and the IPA feed system 204. In some examples, the rotational nodding mechanism 216 can be repositioned to be disposed at a central area of the main reflector 202 at position 218. In such examples, the main reflector 202 would still be rotatable in the clockwise direction 222 and the counter-clockwise direction 224.

The movement mechanisms 214 can further shift correction (linear and rotation) due to clocking. For example, the movement mechanism 214 can include the telescoping boom (e.g., a linear actuator) 214b, a lower gimbal 214c for rotation and/or an upper gimbal 214a for rotation. Thus, the main reflector 202 may be further rotated about upper and lower gimbals 214a, 214c, and relative to the sub-reflector 206 and the IPA feed system 204. In some examples, the lower gimbal 214c provides a similar or identical rotation to the rotational nodding mechanism 216. In some examples, the lower gimbal 214c is the same as the rotational nodding mechanism 216. In some examples, the lower gimbal 214c rotates the main reflector 202 about a different axis than the second axis 220.

Figure 3:
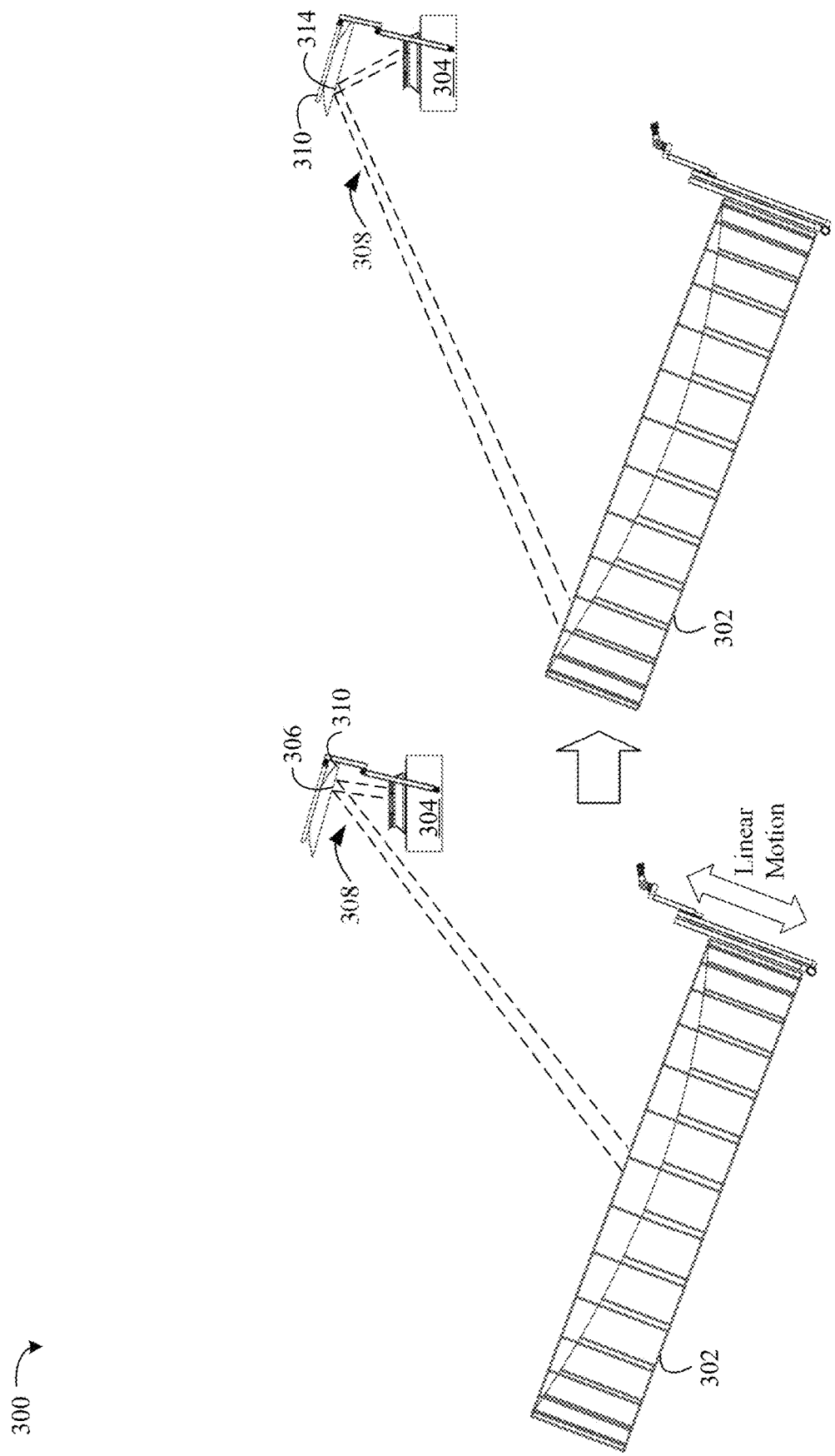
FIG. 3 is a process of an example of adjusting a confocal antenna.

FIG. 3 illustrates a process 300 to adjust a confocal antenna. Examples of FIG. 3 can be used in conjunction with any of the examples described herein, such as process 100 (FIG. 1) and/or defocused confocal antenna 200 (FIG. 2). Initially, an IPA feed system 304 transmits a beam 308 of electromagnetic radiation to a sub-reflector 310. The sub-reflector 310 reflects the beam 308 from a first position 306 of a reflective surface (e.g., a main surface) of the sub-reflector 310. The beam 308 is reflected to the main reflector 302, which in turn can reflect the beam 308 to a target area to generate a radiation pattern. The beam 308 only strikes a portion of the reflective surface of the sub-reflector 310 at first position 306 and not the entire reflective surface.

Thereafter, the main reflector 302 is moved in a linear motion to adjust the radiation pattern. The IPA feed system 304 can correspondingly adjust the direction of the beam 308 to move the position that the beam 308 strikes the reflective surface of the sub-reflector 310. For example, the beam 308 now strikes the main reflector 302 at a second position 314 on the sub-reflector 310 and not the first position 306. Doing so can enhance and simplify operations. For example, the IPA feed system 304 can employ digital signal processing techniques to adjust the direction of the beam 308 to compensate for aberrations that are caused by linearly moving the main reflector 302. Some examples can also include the IPA feed system 304 controlling a strength of beam 308 and/or size of the beam 308 to compensate for aberrations. Some examples can also include only a linear movement of the main reflector 302 without rotating the main reflector 302 to modify the radiation pattern. As noted, the rotation can be unnecessary as the IPA feed system 304 can compensate for the linear movement to generate the radiation pattern in a desired shape. Conversely, some examples can include rotating the main reflector 302 without linearly moving the main reflector 302, and adjusting the IPA feed system 304 to reduce aberrations.

Figure 4A:
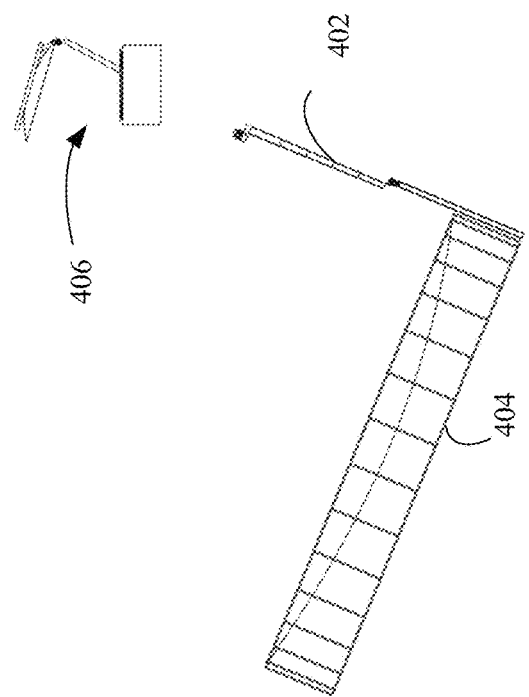
FIG. 4A is an example of extended position of a boom.
Figure 4B:
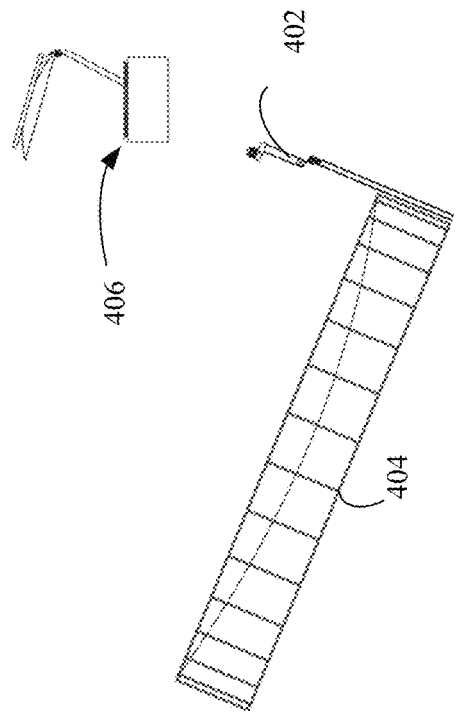
FIG. 4B is an example of retracted position of a boom.

Examples of FIGS. 4A-4F can be used in conjunction with any of the examples described herein, such as process 100 (FIG. 1), defocused confocal antenna 200 (FIG. 2) and/or process 300 (FIG. 3). FIG. 4A illustrates an extended position 400 of a telescopic boom 402 of a confocal antenna having a main reflector 404, as well as a sub-reflector and IPA feed system 406. The main reflector 404 is attached to and moved by the extended telescopic boom 402. The telescopic boom 402 is adjustable to increase in length and decrease in length to facilitate proper positioning of the main reflector 404 relative to the sub-reflector and IPA feed system 406. For example, FIG. 4B illustrates a retracted position 410 of the telescopic boom 402. The telescopic boom 402 is fully retracted to decrease a distance between the main reflector 404 and the sub-reflector and IPA feed system 406. Other linear adjustment mechanisms can be readily utilized as needed. For example, in some examples the telescopic boom 402 can be adjusted in a manner to specified lengths (e.g., in a discrete manner between a limited set of positions), or can be adjusted in a continuous manner (e.g., in a continuous manner to an unlimited set of positions between a maximum and minimum length).

FIG. 4C illustrates a rotation process 420 of the main reflector 404. The main reflector 404 is rotated 424 around point 422 of the telescoping boom 402 to adjust transmission vector 426 (e.g., a main transmission vector of electromagnetic radiation). FIG. 4D illustrates the positional final rotation 430 of the main reflector 404 to change the direction of the transmission vector 426.

Figure 4E:
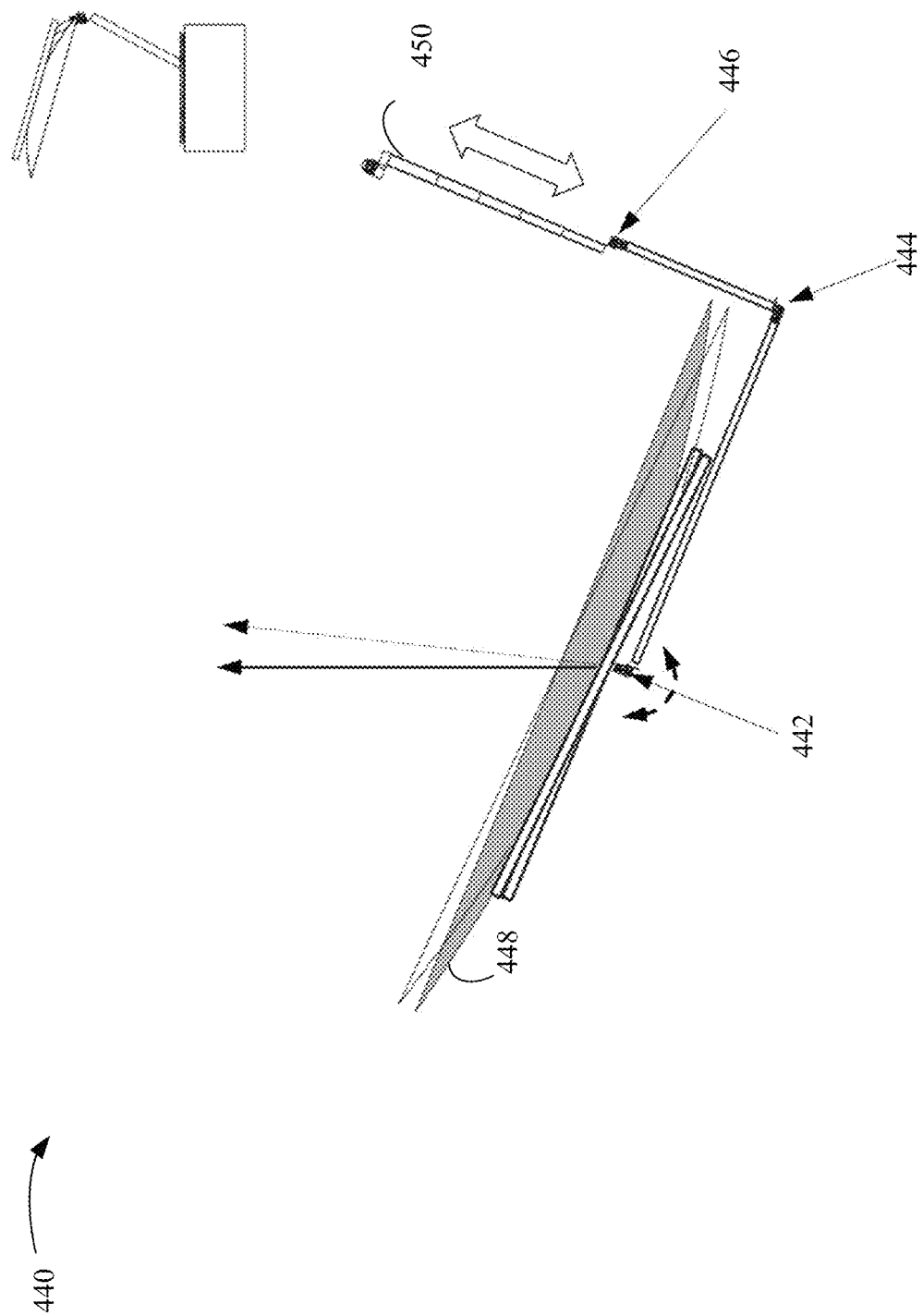
FIG. 4E is an example of a main reflector linear and rotational nodding motion.

FIG. 4E illustrates an example of a main reflector linear and rotational nodding motion. A small aperture confocal antenna 440 is illustrated. A main reflector 448 is rotated about rotational point 442 along an axis that extends into the page. Telescopic boom 450 is extendable along its' axis as well to adjust the position of the main reflector 448. The main reflector 448 is additionally rotatable about pivot points 444, 446. A similar configuration can exist with respect to a large aperture antenna.

Figure 4F:
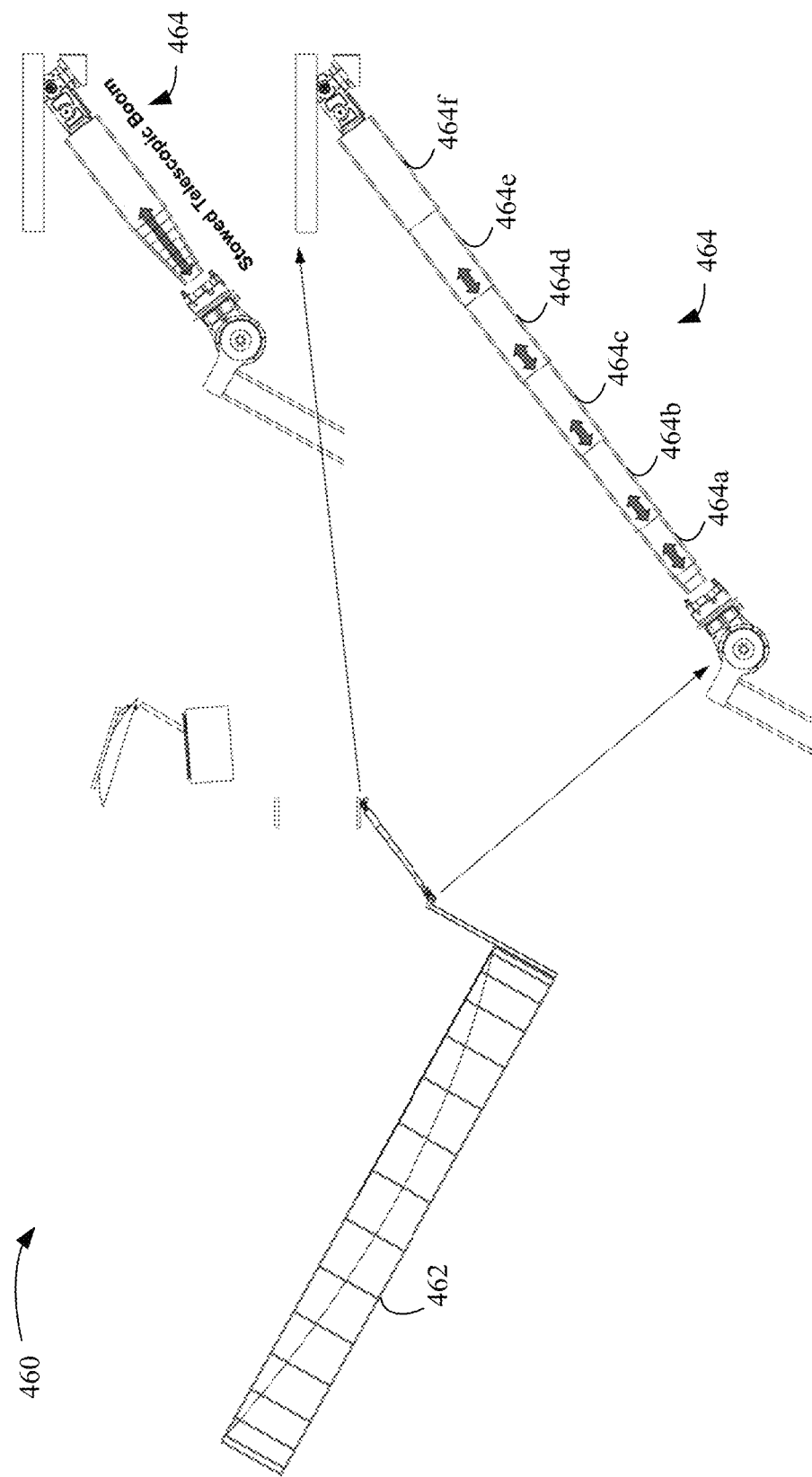
FIG. 4F is an example of a confocal antenna and boom.

FIG. 4F illustrates a confocal antenna 460 in more detail. A main reflector 462 is attached to a telescopic boom 464. The telescopic boom includes sections 464a-464f that are individually extendable and retractable to adjust the position of the main reflector 462. The telescopic boom 464 is able to be moved between a fully retracted position or fully extended position.

Figure 5A:
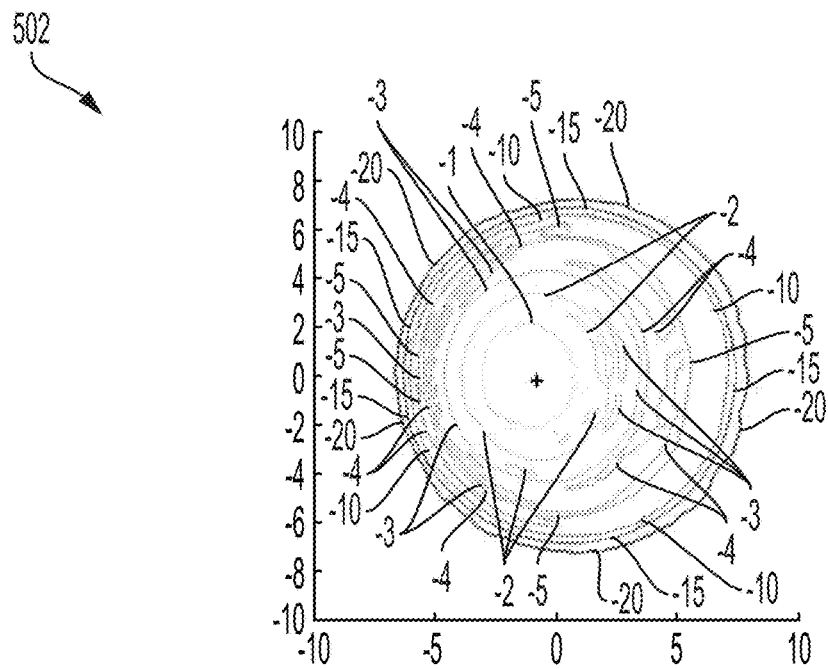
FIGS. 5A, 5B, 5C, 5D, 5E, 5F and 5G are examples of various radiation patterns.
Figure 5A:
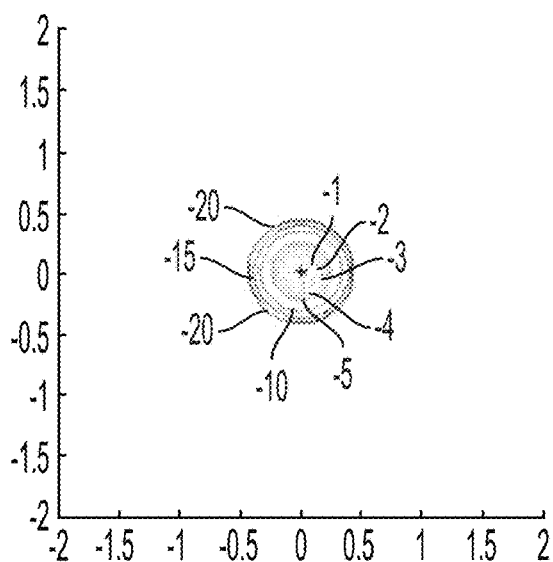
Figure 5A:
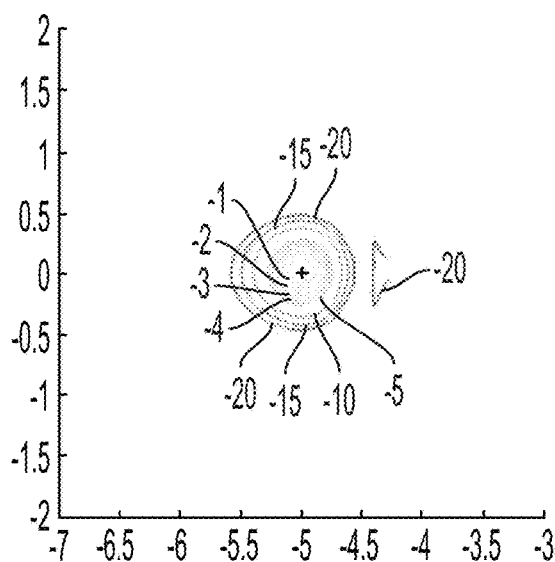
Figure 5B:
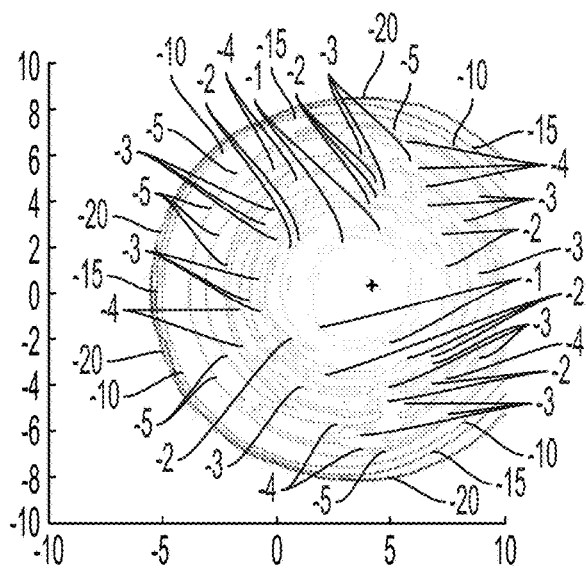
Figure 5B:
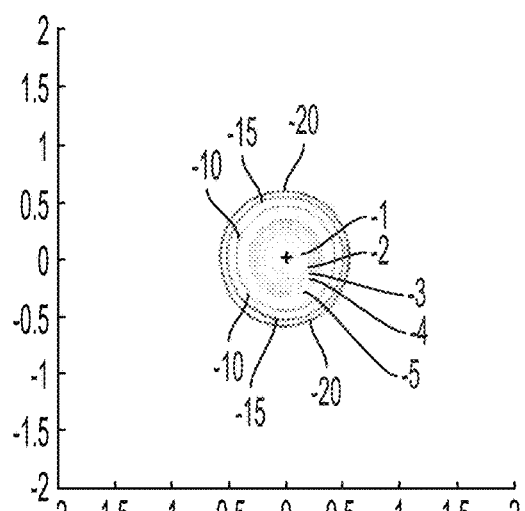
Figure 5B:
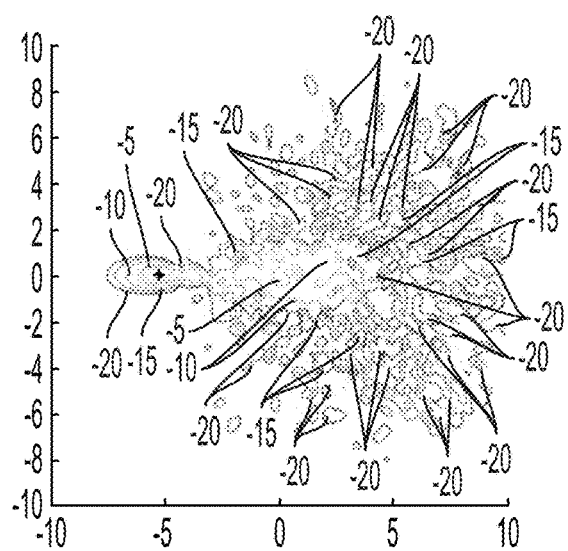
Figure 5C:
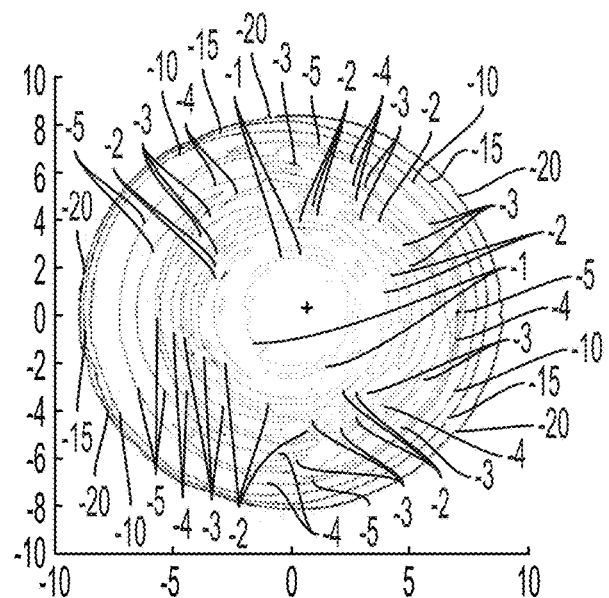
Figure 5C:
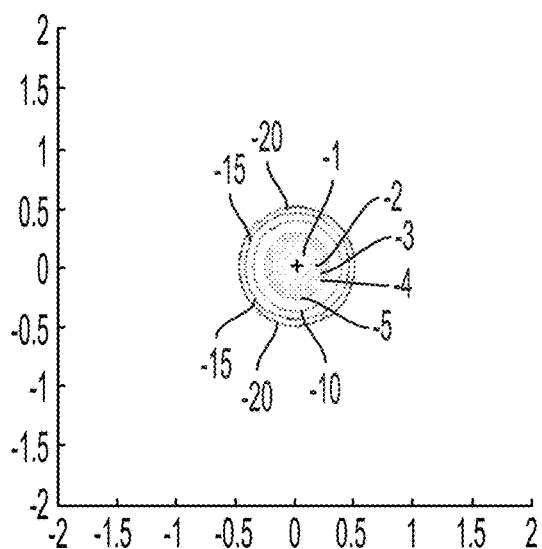
Figure 5C:
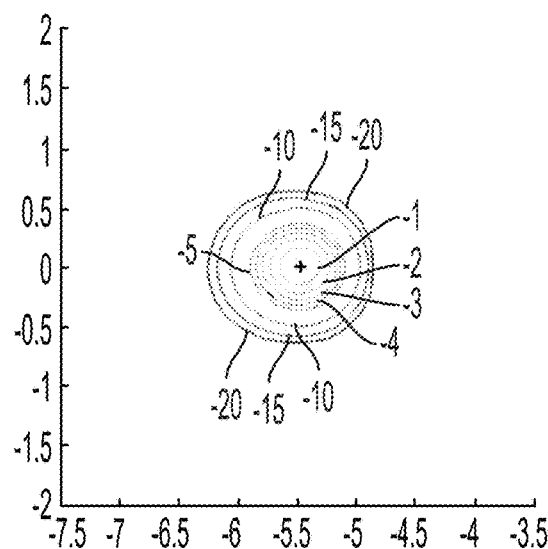
Figure 5D:
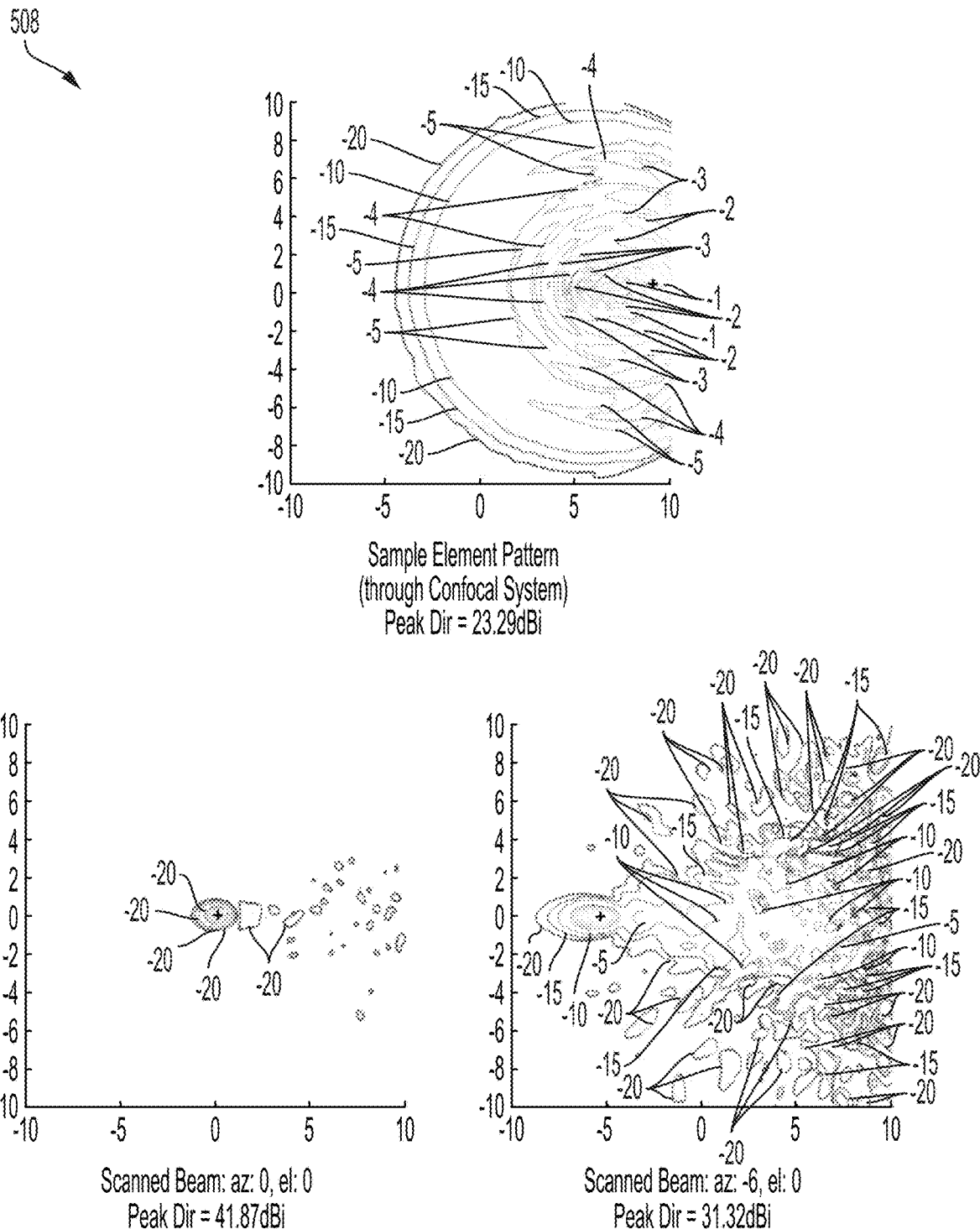
Figure 5E:
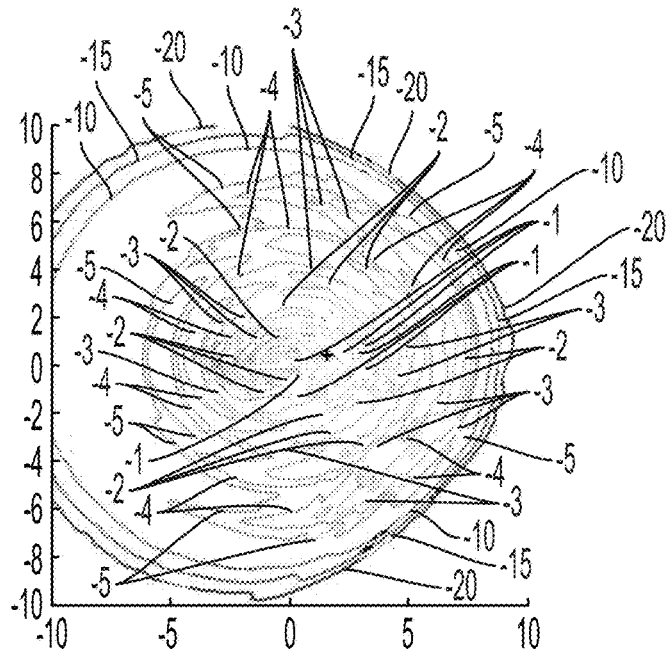
Figure 5E:
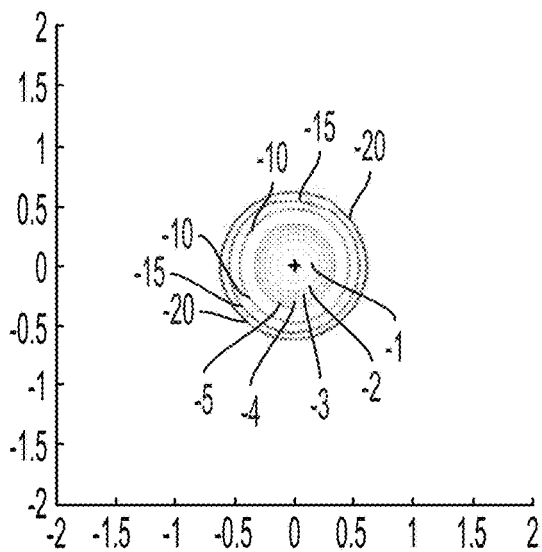
Figure 5E:
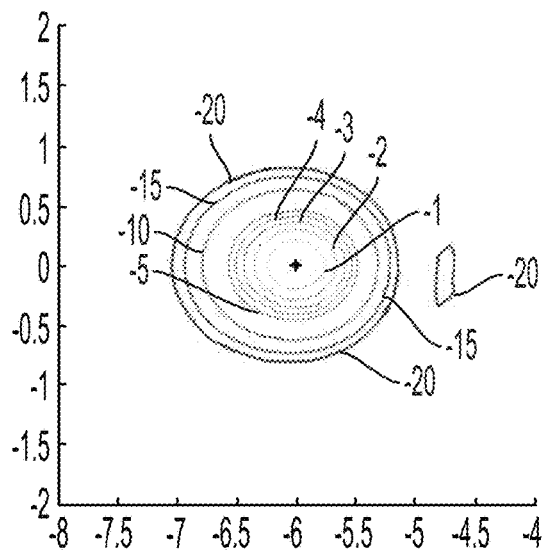
Figure 5F:
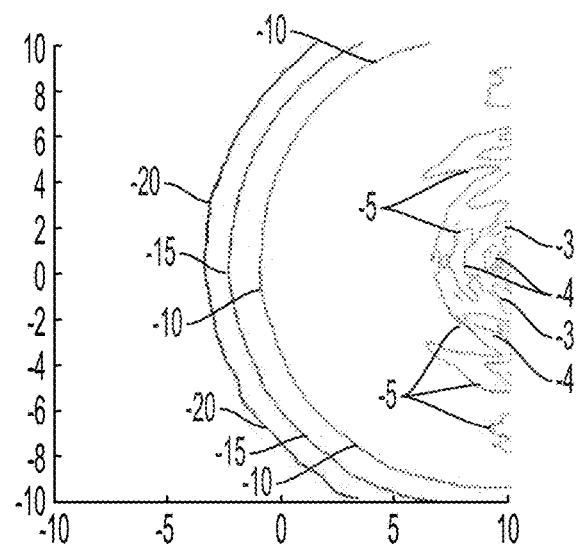
Figure 5F:
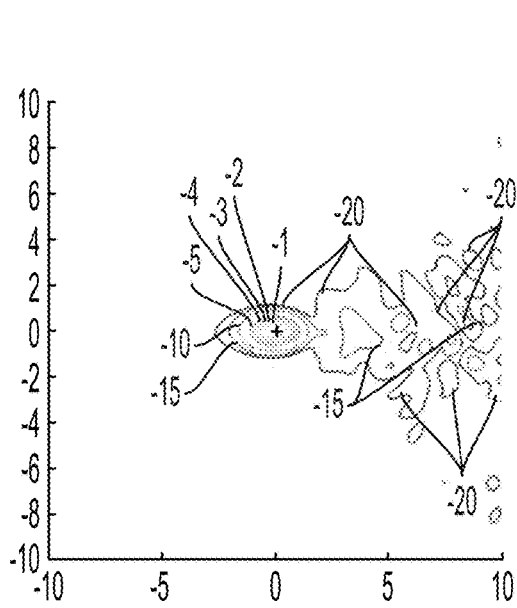
Figure 5F:
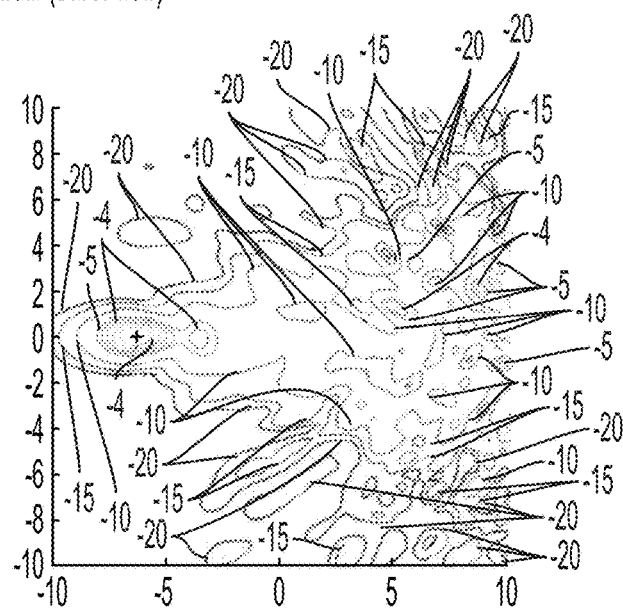
Figure 5G:
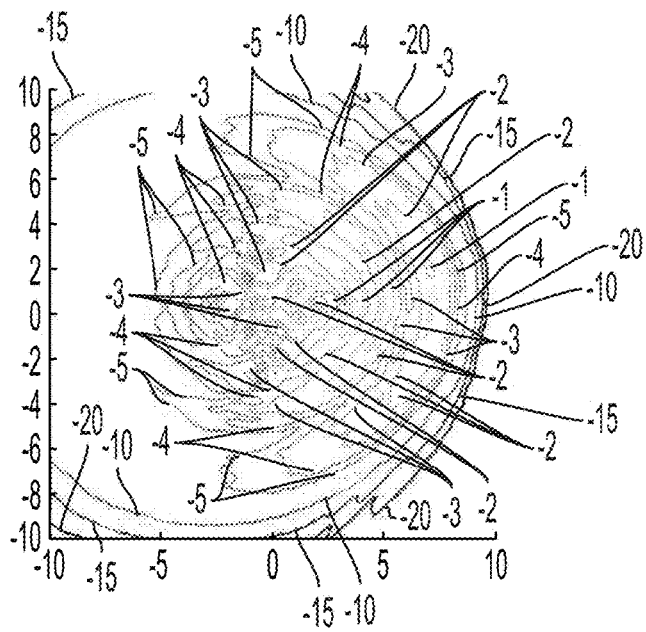
Figure 5G:
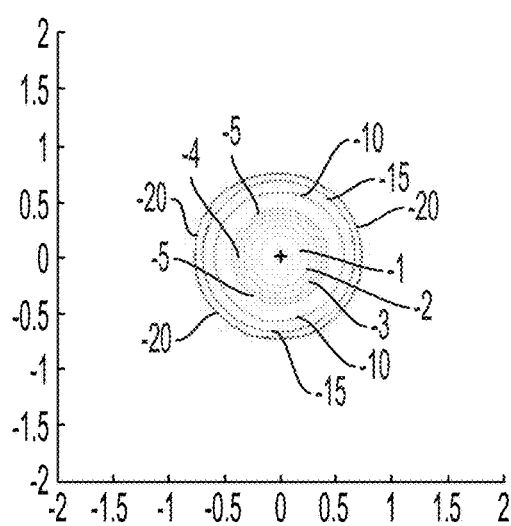
Figure 5G:
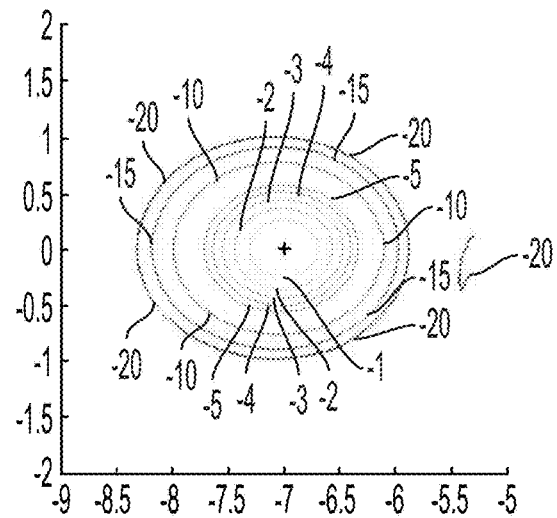

Examples of FIGS. 5A-5G can be used in conjunction with any of the examples described herein, such as process 100 (FIG. 1), defocused confocal antenna 200 (FIG. 2), process 300 (FIG. 3), and/or the examples of FIGS. 4A-4F. FIGS. 5A-5G show various radiation patterns that can be generated by examples described herein. FIG. 5A shows a first case 502 with a baseline performance (e.g., nominal position with no main reflector movement without changes to magnification). The "sample element pattern" as used herein is a pattern of one or more elements of an IPA phase array generating a wide beam. "Scanned beams" as used herein are focused and targeted spot beams as described above. The various radiation patterns are examples illustrating distinctions implementing and omitting IPA control as described herein. FIGS. 5B, 5D, 5F show radiation patterns without corrective IPA control and movements, while FIGS. 5C, 5E, 5G show radiation patterns with corrective IPA control. Each of FIGS. 5A-5G includes a sample element pattern and two different scanned beams having different characteristics.

FIG. 5B shows a second case 504 with a 20", 20 degree linear movement only (e.g., main reflector moved 20" along 20 degrees). The "degree linear movement" as described herein and in each example can correspond to the α°, as defined in FIG. 2. That is, if this example is applied to FIG. 2, the main reflector 202 would be moved linearly along the defocusing vector 208 for 20", and the defocusing vector 208 is separated by 20 degrees from the reflector bore sight 210. As illustrated, aberrations occur when implementing the scanned beam (e.g., az: −5.5, el: 0 and Peak Dir=36.38 dBi) to cause the scanned beam to be irregularly shaped and not in a desired shape (circular). An IPA feed system can be programmed to compensate for such aberrations by beam steering emitted electromagnetic radiation. The aberrations are undesirable as the aberrations reduce signal quality strength and cause a scattered coverage area that is outside of normal operational parameters.

FIG. 5C illustrates a third case 506 where the main reflector is moved along a 20" linear translation and rotated for 3.5° (e.g., a rotational nodding). The IPA feed system can adjust for aberrations as described above. In some examples, rotation is bypassed and the IPA feed system adjusts for the aberrations.

FIG. 5D illustrates a fourth case 508 where a main reflector is moved 40" along 20 degrees. As illustrated, aberrations occur when implementing the scanned beams. An IPA feed system can adjust for such aberrations as described above by beam forming. FIG. 5E illustrates a fifth case 510 where the main reflector undergoes a 40" linear translation and a 7.5° rotational nod, and the IPA feed system adjusts for aberrations.

FIG. 5F illustrates a sixth case 512 where the main reflector undergoes a 60" linear translation only along 20 degrees. As illustrated, aberrations occur with the scanned beams. FIG. 5G illustrates a seventh case where the main reflector undergoes a 60" linear translation along 20 degrees and 12° rotational nodding, along with IPA feed system adjusting for the aberrations to reduce and/or eliminate the aberrations.

Figure 6:
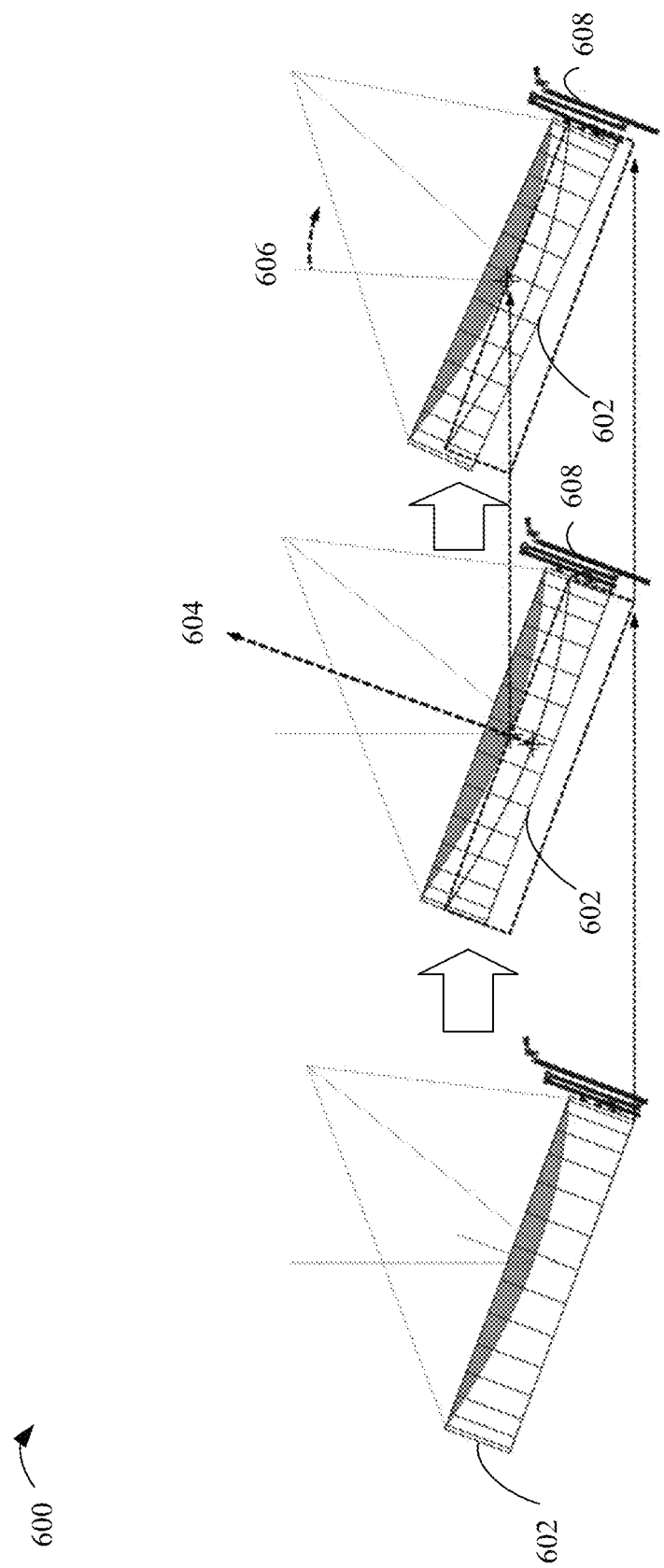
FIG. 6 is a process of an example of shifting a main reflector.
Figure 7:
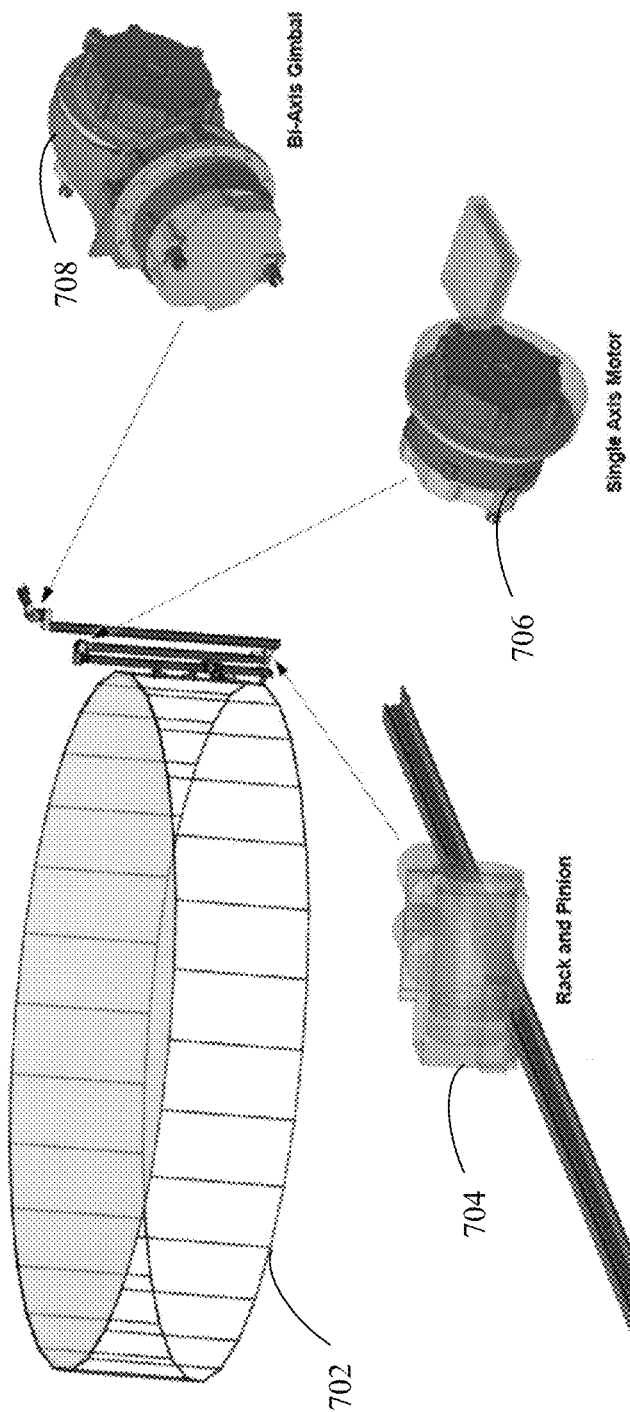
FIG. 7 is an example of a mechanisms that can move a main reflector.

FIG. 6 illustrates a process 600 to shift a main reflector 602 by a translation with a rotation. Process 600 can be used in conjunction with any of the examples described herein, such as process 100 (FIG. 1), defocused confocal antenna 200 (FIG. 2), process 300 (FIG. 3), examples of FIGS. 4A-4F, and/or examples of FIGS. 5A-5F. Main reflector 602 shift correction can be achieved by the use of any combination of the several mechanisms. For example, the main reflector 602 is moved along axis 604, and then rotated by a shift mechanism 608. For example, the shift mechanism 608 can move along a first axis parallel to axis 604 to thereby move the main reflector 602 along the axis 604. The shift mechanism can then rotate about a second axis (e.g., extends inward and outward from the page) perpendicular to the first axis to rotate 606 the main reflector 602. The examples of FIGS. 5A-5G can be implemented by the main reflector 602 and/or shift mechanism FIG. 7 illustrates various mechanisms that can be used to move a main reflector 702. Examples of FIG. 7 can be used in conjunction with any of the examples described herein, such as process 100 (FIG. 1), defocused confocal antenna 200 (FIG. 2), process 300 (FIG. 3), examples of FIGS. 4A-4F, examples of FIGS. 5A-5F and/or process 600 (FIG. 6). A rack and pinion 704 linearly moves the main reflector 702. A single axis motor 706 rotates the main reflector 702. A bi-axial gimbal 708 unfurls the main reflector 702 from a packed position to an unfurled position when at an appropriate position.

Figure 8:
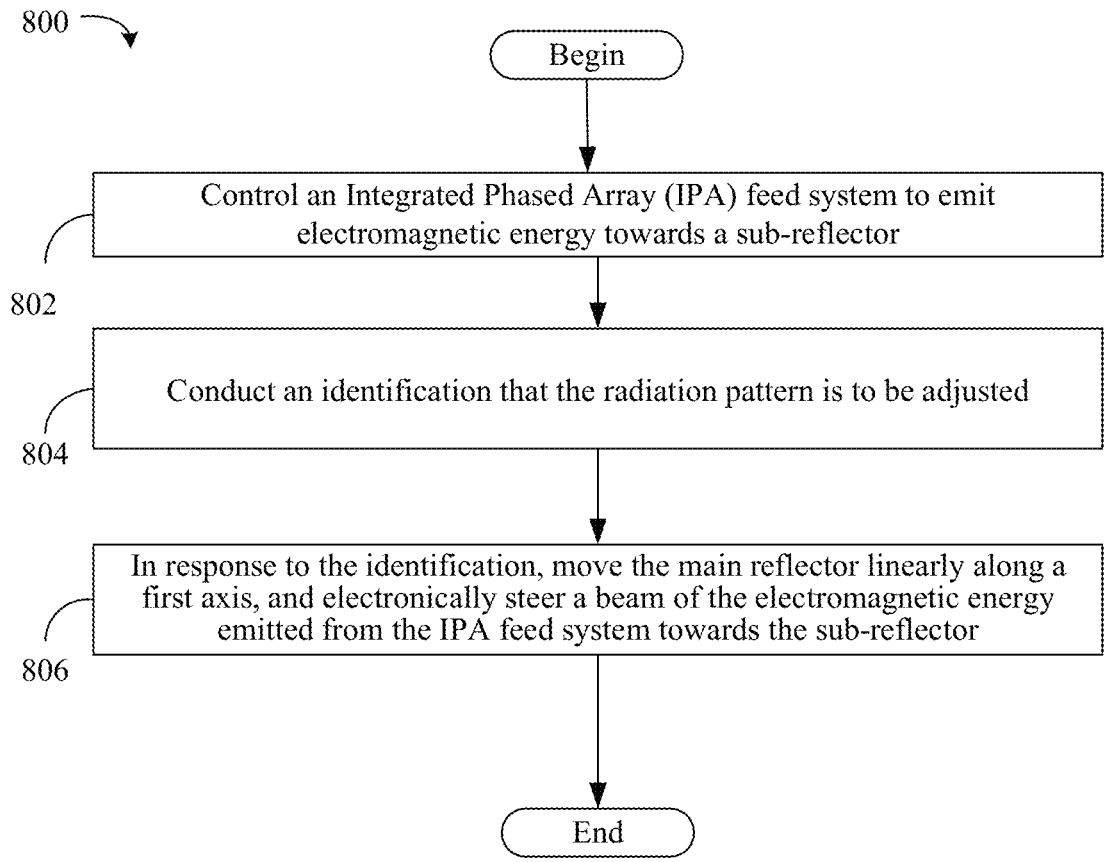
FIG. 8 is a flowchart of an example of a method of adjusting a confocal antenna according to an example.

FIG. 8 shows a method 800 of adjusting a confocal antenna. The method 800 is generally implemented in a satellite already discussed. Method 800 can be used in conjunction with any of the examples described herein, such as process 100 (FIG. 1), defocused confocal antenna 200 (FIG. 2), process 300 (FIG. 3), examples of FIGS. 4A-4F, examples of FIGS. 5A-5G, process 600 (FIG. 6) and/or examples of FIG. 7. In an example, the method 800 is implemented in one or more modules as a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 802 controls an IPA feed system to emit electromagnetic energy towards a sub-reflector. The sub-reflector reflects the electromagnetic energy to a main reflector. The main reflector receives and reflects the electromagnetic energy to form a radiation pattern on an area (e.g., on Earth), where the radiation pattern has a first size and a first gain. Illustrated processing block 804 conducts an identification that the radiation pattern is to be adjusted. For example, processing block 804 determines that the first size is to be adjusted to a second size and the first gain is to be adjusted to a second gain. In response to the identification, illustrated processing block 806 moves the main reflector linearly along a first axis, and electronically steers a beam of the electromagnetic energy emitted from the IPA feed system towards the sub-reflector. The method 800 can include moving the main reflector relative to the sub-reflector and the IPA feed system along the first axis. The method 800 can include in response to the identification, rotating the main reflector along a second axis perpendicular to the first axis. The confocal antenna system can be part of a satellite.

The method 800 can include the IPA feed system being an electronically-reconfigurable phased array feed, and adjusting the electromagnetic energy emitted from the IPA feed system to reduce or eliminate one or more aberrations caused by moving the main reflector linearly along the first axis. The method 800 can include adjusting emitter phases and/or amplitude and phase of the electromagnetic energy emitted from the IPA feed system to steer the beam. The method 800 can include in response to the identification, suppressing an amount of the electromagnetic energy emitted in a first direction from the IPA feed system, and increasing an amount of the electromagnetic energy emitted in a second direction from the IPA feed system.

Figure 9:
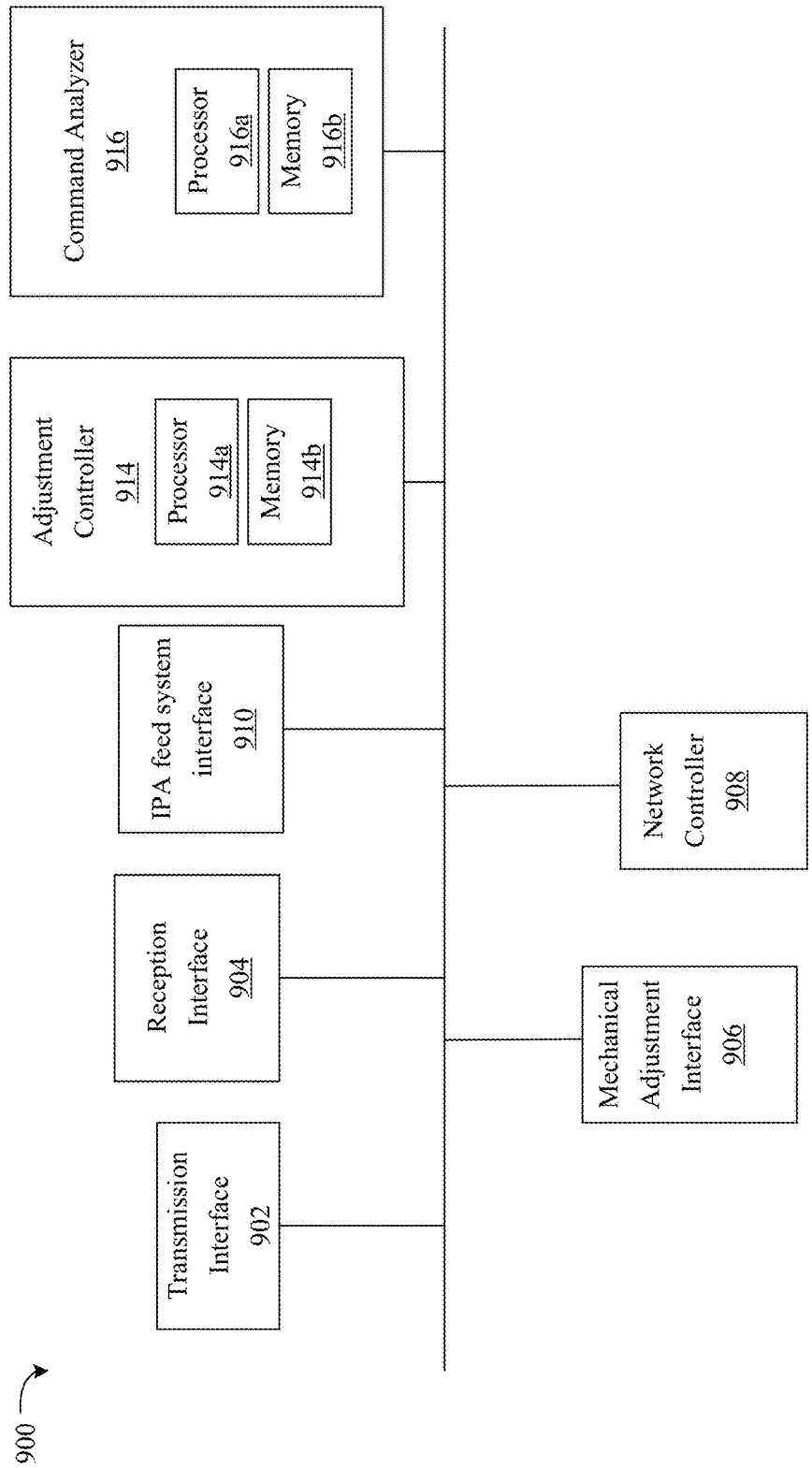
FIG. 9 is a block diagram of an example of a satellite controller according to an example.

FIG. 9 shows a more detailed example of a satellite controller 900 that enables adjustments to a confocal feed array fed confocal antenna system. The satellite controller 900 can be used in conjunction with any of the examples described herein, such as process 100 (FIG. 1), defocused confocal antenna 200 (FIG. 2), process 300 (FIG. 3), examples of FIGS. 4A-4F, examples of FIGS. 5A-5G, process 600 (FIG. 6), examples of FIG. 7 and/or method 800 (FIG. 8).

The controller 900 includes a transmission interface 902 to control transmission of signals from an IPA feed system (e.g., data packets), and a reception interface 904 to receive signals from ground. The controller 900 includes an IPA feed system interface 910 to control a direction and strength of electromagnetic energy emitted from the IPA feed system. A mechanical adjustment interface 906 facilitates communication and control over one or more mechanisms that move a main reflector. A network controller 908 can establish an internet connection with a ground component for communications to transmit messages and receive messages from the ground component. In some examples, the network controller 908 can use other modes of communication (e.g., radio) besides an internet connection.

An adjustment controller 914 can control a position and rotation of the main reflector through the mechanical adjustment interface 906 to control a gain and size of a radiation pattern. A command analyzer 916 can receive commands from the on-ground component either through the reception interface 904 or the network controller 908. The command analyzer can analyze the commands to determine an appropriate action to execute. For example, the command can indicate that the radiation pattern is to be adjusted and/or change the position of the main reflector. In response, the command analyzer 916 can appropriately route the message to the adjustment controller 914 to execute the command.

Additionally, the adjustment controller 914 includes a processor 914a (e.g., embedded controller, central processing unit/CPU) and a memory 914b (e.g., non-volatile memory/NVM and/or volatile memory) containing a set of instructions, which when executed by the processor 914a, implements any of the aspects as described herein.

Additionally, the adjustment controller 914 includes a processor 914a (e.g., embedded controller, central processing unit/CPU) and a memory 914b (e.g., non-volatile memory/NVM and/or volatile memory) containing a set of instructions, which when executed by the processor 914a, implements any of the aspects as described herein.

Thus, technology described herein supports an enhanced method of communication and particularly dynamic adjustment of a radiation pattern of a satellite. Doing so reduces latency in communications, permits new radiation patterns to be generated on the-fly, and simplifies the process of adjusting the radiation pattern.

The present disclosure provides additional examples as detailed in the following clauses.

Clause 1. A confocal antenna system comprising:
an Integrated Phased Array (IPA) feed system to emit electromagnetic energy;
a sub-reflector to reflect the electromagnetic energy;
a main reflector to receive and reflect the electromagnetic energy to form a radiation pattern on an area, wherein the radiation pattern has a first size and a first gain;
at least one processor; and
at least one memory coupled to the at least one processor, the at least one memory including a set of instructions, which when executed by the at least one processor, causes the confocal antenna system to:
conduct an identification that the radiation pattern is to be adjusted so as to adjust the first size to a second size and adjust the first gain to a second gain; and
in response to the identification,
move the main reflector linearly along a first axis, and
electronically steer a beam of the electromagnetic energy emitted from the IPA feed system towards the sub-reflector.

Clause 2. The confocal antenna system of claim 1, wherein the instructions, when executed, cause the confocal antenna system to:
move the main reflector relative to the sub-reflector and the IPA feed system along the first axis.

Clause 3. The confocal antenna system of claim 1 or 2, wherein the instructions, when executed, cause the confocal antenna system to:
in response to the identification, rotate the main reflector along a second axis perpendicular to the first axis.

Clause 4. The confocal antenna system of any one of claims 1-3, wherein:
the IPA feed system is an electronically-reconfigurable phased array feed; and
the instructions, when executed, cause the confocal antenna system to adjust the electromagnetic energy emitted from the IPA feed system to reduce or eliminate one or more aberrations caused by moving the main reflector linearly along the first axis.

Clause 5. The confocal antenna system of any one of claims 1-4, wherein the instructions, when executed, cause the confocal antenna system to:
adjust emitter phases of the electromagnetic energy emitted from the IPA feed system to steer the beam.

Clause 6. The confocal antenna system of any one of claims 1-5, wherein the instructions, when executed, cause the confocal antenna system to:
in response to the identification,
suppress an amount of the electromagnetic energy emitted in a first direction from the IPA feed system, and
increase an amount of the electromagnetic energy emitted in a second direction from the IPA feed system.

Clause 7. The confocal antenna system of any one of claims 1-6, wherein the confocal antenna system is part of a satellite.

Clause 8. At least one non-transitory computer readable storage medium comprising a set of instructions, which when executed by a computing device associated with a confocal antenna system, causes the computing device to:
control an Integrated Phased Array (IPA) feed system to emit electromagnetic energy towards a sub-reflector, wherein the sub-reflector reflects the electromagnetic energy to a main reflector, wherein the main reflector receives and reflects the electromagnetic energy to form a radiation pattern on an area, wherein the radiation pattern has a first size and a first gain;
conduct an identification that the radiation pattern is to be adjusted so as to adjust the first size to a second size and adjust the first gain to a second gain; and
in response to the identification,
move the main reflector linearly along a first axis, and
electronically steer a beam of the electromagnetic energy emitted from the IPA feed system towards the sub-reflector.

Clause 9. The at least one non-transitory computer readable storage medium of claim 8, wherein the instructions, when executed, cause the computing device to:
move the main reflector relative to the sub-reflector and the IPA feed system along the first axis.

Clause 10. The at least one non-transitory computer readable storage medium of claim 8 or 9, wherein the instructions, when executed, cause the computing device to:
in response to the identification, rotate the main reflector along a second axis perpendicular to the first axis.

Clause 11. The at least one non-transitory computer readable storage medium of any one of claims 8-10, wherein:
the IPA feed system is an electronically-reconfigurable phased array feed; and
the instructions, when executed, cause the computing device to adjust the electromagnetic energy emitted from the IPA feed system to reduce or eliminate one or more aberrations caused by moving the main reflector linearly along the first axis.

Clause 12. The at least one non-transitory computer readable storage medium of any one of claims 8-11, wherein the instructions, when executed, cause the computing device to:
adjust emitter phases of the electromagnetic energy emitted from the IPA feed system to steer the beam.

Clause 13. The at least one non-transitory computer readable storage medium of any one of claims 8-12, wherein the instructions, when executed, cause the computing device to:
in response to the identification,
suppress an amount of the electromagnetic energy emitted in a first direction from the IPA feed system, and
increase an amount of the electromagnetic energy emitted in a second direction from the IPA feed system.

Clause 14. The at least one non-transitory computer readable storage medium of any one of claims 8-13, wherein the confocal antenna system is part of a satellite.

Clause 15. A method of controlling a confocal antenna system, the method comprising:
controlling an Integrated Phased Array (IPA) feed system to emit electromagnetic energy towards a sub-reflector, wherein the sub-reflector reflects the electromagnetic energy to a main reflector, wherein the main reflector receives and reflects the electromagnetic energy to form a radiation pattern on an area, wherein the radiation pattern has a first size and a first gain; and
conducting an identification that the radiation pattern is to be adjusted so as to adjust the first size to a second size and adjust the first gain to a second gain; and
in response to the identification,
moving the main reflector linearly along a first axis, and
electronically steering a beam of the electromagnetic energy emitted from the IPA feed system towards the sub-reflector.

Clause 16. The method of claim 15, further comprising:
moving the main reflector relative to the sub-reflector and the IPA feed system along the first axis.

Clause 17. The method of claim 15 or 16, further comprising:
in response to the identification, rotating the main reflector along a second axis perpendicular to the first axis.

Clause 18. The method of any one of claims 15-17, wherein:

the IPA feed system is an electronically-reconfigurable phased array feed; and the method comprises adjusting the electromagnetic energy emitted from the IPA feed system to reduce or eliminate one or more aberrations caused by moving the main reflector linearly along the first axis.

Clause 19. The method of any one of claims 15-18, further comprising:

adjusting emitter phases of the electromagnetic energy emitted from the IPA feed system to steer the beam.

Clause 20. The method of any one of claims 15-19, further comprising:

in response to the identification,
   suppressing an amount of the electromagnetic energy emitted in a first direction from the IPA feed system, and
   increasing an amount of the electromagnetic energy emitted in a second direction from the IPA feed system.

Clause 21. The method of any one claims 15-20, wherein the confocal antenna system is part of a satellite.

Clause 22. A confocal antenna system, the system comprising:

means for controlling an Integrated Phased Array (IPA) feed system to emit electromagnetic energy towards a sub-reflector, wherein the sub-reflector reflects the electromagnetic energy to a main reflector, wherein the main reflector receives and reflects the electromagnetic energy to form a radiation pattern on an area, wherein the radiation pattern has a first size and a first gain; and means for conducting an identification that the radiation pattern is to be adjusted so as to adjust the first size to a second size and adjust the first gain to a second gain; and in response to the identification,
   means for moving the main reflector linearly along a first axis, and
   means for electronically steering a beam of the electromagnetic energy emitted from the IPA feed system towards the sub-reflector.

Clause 23. The system of claim 22, further comprising:

means for moving the main reflector relative to the sub-reflector and the IPA feed system along the first axis.

Clause 24. The system of claim 22 or 23, further comprising:

in response to the identification, means for rotating the main reflector along a second axis perpendicular to the first axis.

Clause 25. The system of any one of claims 22-24, wherein:

the IPA feed system is an electronically-reconfigurable phased array feed; and the system comprises means for adjusting the electromagnetic energy emitted from the IPA feed system to reduce or eliminate one or more aberrations caused by moving the main reflector linearly along the first axis.

Clause 26. The system of any one of claims 22-25, further comprising:

means for adjusting emitter phases of the electromagnetic energy emitted from the IPA feed system to steer the beam.

Clause 27. The system of any one of claims 22-26, further comprising:

in response to the identification,
   means for suppressing an amount of the electromagnetic energy emitted in a first direction from the IPA feed system, and
   means for increasing an amount of the electromagnetic energy emitted in a second direction from the IPA feed system.

Clause 28. The system of any one of claims 22-27, wherein the confocal antenna system is part of a satellite.

Example sizes/models/values/ranges can have been given, although examples are not limited to the same. As manufacturing techniques (e.g., photolithography) mature over time, it is expected that devices of smaller size could be manufactured. In addition, well known power/ground connections to IC chips and other components can or cannot be shown within the figures, for simplicity of illustration and discussion, and so as not to obscure certain aspects of the examples. Further, arrangements can be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. Where specific details (e.g., circuits) are set forth in order to describe example examples, it should be apparent to one skilled in the art that examples can be practiced without, or with variation of, these specific details. The description is thus to be regarded as illustrative instead of limiting.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated.

As used in this application and in the claims, a list of items joined by the term "one or more of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

We claim:

1. A confocal antenna system comprising:

an Integrated Phased Array (IPA) feed system to emit electromagnetic energy;

a sub-reflector to reflect the electromagnetic energy;

a main reflector to receive and reflect the electromagnetic energy from the sub-reflector to form a radiation pattern on an area, wherein the radiation pattern has a first size and a first gain;

at least one processor; and at least one memory coupled to the at least one processor, the at least one memory including a set of instructions, which when executed by the at least one processor, causes the confocal antenna system to:
   conduct an identification that the radiation pattern is to be adjusted so as to adjust the first size to a second size and adjust the first gain to a second gain; and in response to the identification,
move the main reflector linearly along a first axis to cause the main reflector to undergo a linear movement to a position, wherein the linear movement of the main reflector to the position is associated with aberrations in the radiation pattern, and
reduce an occurrence of the aberrations in the radiation pattern when the main reflector is at the position by
identifying first phases of individual emitters of the IPA feed system, that electronically steer a beam of the electromagnetic energy emitted from the IPA feed system towards the sub-reflector, based on the linear movement of the main reflector to adjust a position of impingement of the beam on the sub-reflector,
identifying higher order phase distortions caused by the main reflector and the sub-reflector,
identifying complex excitation of the individual emitters that correct for the higher order phase distortions, wherein the complex excitation includes second phases,
adding the second phases to the first phases to generate final phases, and
adjusting, based on the final phases, the electromagnetic energy that is emitted from the individual emitters.

2. The confocal antenna system of claim 1, wherein the instructions, when executed, cause the confocal antenna system to:
move the main reflector relative to the sub-reflector and the IPA feed system along the first axis, and
wherein to electronically steer the beam, the instructions, when executed by the at least one processor, causes the confocal antenna system to electronically steer the beam concurrently with the main reflector undergoing the linear movement,
wherein the aberrations include one or more of a reduction to an integrity of a beam main lobe of the radiation pattern or a reduction to a sidelobe integrity of the radiation pattern, and
wherein the aberrations include the radiation pattern deviating from a circular shape.

3. The confocal antenna system of claim 1, wherein the instructions, when executed, cause the confocal antenna system to:
in response to the identification that the radiation pattern is to be adjusted, rotate the main reflector along a second axis perpendicular to the first axis.

4. The confocal antenna system of claim 1, wherein:
the IPA feed system is an electronically-reconfigurable phased array feed.

5. The confocal antenna system of claim 1, wherein to reduce the occurrence of the aberrations in the radiation pattern, the instructions, when executed, cause the confocal antenna system to:
eliminate the occurrence of the aberrations by adjusting a position that the beam strikes the sub-reflector by adjusting emitter phases of the individual emitters to the final phases, and an amplitude of the individual emitters,
wherein the complex excitation further includes the amplitude, and
wherein the higher order phase distortions include spherical phase errors, parabolic phase errors, and comma phase errors.

6. The confocal antenna system of claim 1, wherein to electronically steer the beam of the electromagnetic energy emitted from the IPA feed system towards the sub-reflector, the instructions, when executed, cause the confocal antenna system to:
suppress an amount of the electromagnetic energy emitted in a first direction from the IPA feed system, and
increase an amount of the electromagnetic energy emitted in a second direction from the IPA feed system.

7. The confocal antenna system of claim 1, wherein the confocal antenna system is part of a satellite.

8. At least one non-transitory computer readable storage medium comprising a set of instructions, which when executed by a computing device associated with a confocal antenna system, causes the computing device to:
control an Integrated Phased Array (IPA) feed system to emit electromagnetic energy towards a sub-reflector, wherein the sub-reflector reflects the electromagnetic energy to a main reflector, wherein the main reflector receives and reflects the electromagnetic energy from the sub-reflector to form a radiation pattern on an area, wherein the radiation pattern has a first size and a first gain;
conduct an identification that the radiation pattern is to be adjusted so as to adjust the first size to a second size and adjust the first gain to a second gain; and
in response to the identification,
move the main reflector linearly along a first axis to cause the main reflector to undergo a linear movement to a position, wherein the linear movement of the main reflector to the position is associated with aberrations in the radiation pattern, and
reduce an occurrence of the aberrations in the radiation pattern when the main reflector is at the position by
identifying first phases of individual emitters of the IPA feed system, that electronically steer a beam of the electromagnetic energy emitted from the IPA feed system towards the sub-reflector, based on the linear movement of the main reflector to adjust a position of impingement of the beam on the sub-reflector,
identifying higher order phase distortions caused by the main reflector and the sub-reflector,
identifying complex excitation of the individual emitters that correct for the higher order phase distortions, wherein the complex excitation includes second phases,
adding the second phases to the first phases to generate final phases, and
adjusting, based on the final phases, the electromagnetic energy that is emitted from the individual emitters.

9. The at least one non-transitory computer readable storage medium of claim 8, wherein the instructions, when executed, cause the computing device to:
move the main reflector relative to the sub-reflector and the IPA feed system along the first axis, and
wherein to electronically steer the beam, the instructions, when executed, cause the computing device to electronically steer the beam concurrently with the main reflector undergoing the linear movement,
wherein the aberrations include one or more of a reduction to an integrity of a beam main lobe of the radiation pattern or a reduction to a sidelobe integrity of the radiation pattern, and
wherein the aberrations include the radiation pattern deviating from a circular shape.

10. The at least one non-transitory computer readable storage medium of claim 8, wherein the instructions, when executed, cause the computing device to:
in response to the identification that the radiation pattern is to be adjusted, rotate the main reflector along a second axis perpendicular to the first axis.

11. The at least one non-transitory computer readable storage medium of claim 8, wherein:
the IPA feed system is an electronically-reconfigurable phased array feed.

12. The at least one non-transitory computer readable storage medium of claim 8, wherein to reduce the occurrence of the aberrations in the radiation pattern, the instructions, when executed, cause the computing device to:
eliminate the occurrence of the aberrations by adjusting a position that the beam strikes the sub-reflector by adjusting emitter phases of the individual emitters to the final phases, and an amplitude of the individual emitters,
wherein the complex excitation further includes the amplitude, and
wherein the higher order phase distortions include spherical phase errors, parabolic phase errors, and comma phase errors.

13. The at least one non-transitory computer readable storage medium of claim 8, wherein to electronically steer the beam, the instructions, when executed, cause the computing device to:
suppress an amount of the electromagnetic energy emitted in a first direction from the IPA feed system, and
increase an amount of the electromagnetic energy emitted in a second direction from the IPA feed system.

14. The at least one non-transitory computer readable storage medium of claim 8, wherein the confocal antenna system is part of a satellite.

15. A method of controlling a confocal antenna system, the method comprising:
controlling an Integrated Phased Array (IPA) feed system to emit electromagnetic energy towards a sub-reflector, wherein the sub-reflector reflects the electromagnetic energy to a main reflector, wherein the main reflector receives and reflects the electromagnetic energy from the sub-reflector to form a radiation pattern on an area, wherein the radiation pattern has a first size and a first gain; and
conducting an identification that the radiation pattern is to be adjusted so as to adjust the first size to a second size and adjust the first gain to a second gain; and
in response to the identification,
moving the main reflector linearly along a first axis to cause the main reflector to undergo a linear movement to a position, wherein the linear movement of the main reflector to the position is associated with aberrations in the radiation pattern, and
reducing an occurrence of the aberrations in the radiation pattern when the main reflector is at the position by
identifying first phases of individual emitters of the IPA feed system, that electronically steer a beam of the electromagnetic energy emitted from the IPA feed system towards the sub-reflector, based on the linear movement of the main reflector to adjust a position of impingement of the beam on the sub-reflector,
identifying higher order phase distortions caused by the main reflector and the sub-reflector,
identifying complex excitation of the individual emitters that correct for the higher order phase distortions, wherein the complex excitation includes second phases,
adding the second phases to the first phases to generate final phases, and
adjusting, based on the final phases, the electromagnetic energy that is emitted from the individual emitters.

16. The method of claim 15, further comprising:
moving the main reflector relative to the sub-reflector and the IPA feed system along the first axis; and
electronically steering the beam concurrently with the main reflector undergoing the linear movement,
wherein the aberrations include one or more of a reduction to an integrity of a beam main lobe of the radiation pattern or a reduction to a sidelobe integrity of the radiation pattern, and
wherein the aberrations include the radiation pattern deviating from a circular shape.

17. The method of claim 15, further comprising:
in response to the identification that the radiation pattern is to be adjusted, rotating the main reflector along a second axis perpendicular to the first axis.

18. The method of claim 15, wherein:
the IPA feed system is an electronically-reconfigurable phased array feed.

19. The method of claim 15, wherein the reducing the occurrence of the aberrations in the radiation pattern further comprises:
eliminating the occurrence of the aberrations by adjusting a position that the beam strikes the sub-reflector by adjusting emitter phases of the individual emitters to the final phases, and an amplitude of the individual emitters,
wherein the complex excitation further includes the amplitude, and
wherein the higher order phase distortions include spherical phase errors, parabolic phase errors, and comma phase errors.

20. The method of claim 15, wherein the electronically steering comprises:
suppressing an amount of the electromagnetic energy emitted in a first direction from the IPA feed system, and
increasing an amount of the electromagnetic energy emitted in a second direction from the IPA feed system.

\* \* \* \* \*